US012443326B2

(12) United States Patent
Loggins

(10) Patent No.: US 12,443,326 B2
(45) Date of Patent: Oct. 14, 2025

(54) SYSTEMS AND METHODS OF VIRTUALIZED SYSTEMS ON ELECTRONIC DEVICES

(71) Applicant: Apple Inc., Cupertino, CA (US)

(72) Inventor: Benjamin B. Loggins, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 18/390,914

(22) Filed: Dec. 20, 2023

(65) Prior Publication Data

US 2024/0211092 A1    Jun. 27, 2024

Related U.S. Application Data

(60) Provisional application No. 63/477,122, filed on Dec. 23, 2022.

(51) Int. Cl.
| | |
|---|---|
| *G06F 3/04815* | (2022.01) |
| *G06F 3/0484* | (2022.01) |
| *G06F 3/0488* | (2022.01) |
| *G06F 3/0489* | (2022.01) |
| *G06F 9/451* | (2018.01) |

(Continued)

(52) U.S. Cl.
CPC ........ *G06F 3/04815* (2013.01); *G06F 3/0484* (2013.01); *G06F 9/451* (2018.02); *G06T 13/40* (2013.01); *G06T 19/00* (2013.01); *G06F 3/0488* (2013.01); *G06F 3/0489* (2013.01); *G06T 2200/24* (2013.01)

(58) Field of Classification Search
CPC .. G09F 3/04815; G09F 3/0484; G09F 3/0488; G09F 3/0489; G09F 9/451; G06T 13/40; G06T 2200/24; G06T 19/00

USPC ......................................................... 351/168
See application file for complete search history.

(56) References Cited

U.S. PATENT DOCUMENTS 8,226,477 B1 * 7/2012 Machado ............. G06Q 10/105
273/317.1
2020/0117212 A1 * 4/2020 Tian .................... G01C 21/206

(Continued)

OTHER PUBLICATIONS

International Search Report received for PCT Patent Application No. PCT/US2023/085173, mailed on Mar. 14, 2024, 4 pages.

*Primary Examiner* — Mark Edwards
(74) *Attorney, Agent, or Firm* — Kubota & Basol LLP

(57) ABSTRACT

Some examples of the disclosure are directed to a virtualized system on an electronic device. In some embodiments, a simulator application that includes a guest operating system is provided on an electronic device. In some embodiments, the simulator application provides a testing environment for a virtual experience of a secondary application that is in communication with the guest operating system. In some embodiments, the electronic device displays a user interface associated with the simulator application, the user interface including a computer-generated environment and an object. In some embodiments, while displaying the user interface, the electronic device receives an input that corresponds to a request to cause the object to perform a respective operation in the computer-generated environment. In some embodiments, in response to receiving the input, the electronic device causes the object to perform an operation based on the input and updates the computer-generated environment based on the operation.

20 Claims, 25 Drawing Sheets

(51) Int. Cl.
   *G06T 13/40*   (2011.01)
   *G06T 19/00*   (2011.01)

(56) References Cited

U.S. PATENT DOCUMENTS

2020/0393952 A1* 12/2020 Hsiao .................... G06F 3/0482
2022/0318035 A1   10/2022 Garstenauer et al.
2023/0011228 A1*  1/2023 Kaku ................... G02B 27/017

* cited by examiner

SYSTEMS AND METHODS OF VIRTUALIZED SYSTEMS ON ELECTRONIC DEVICES

CROSS-REFERENCE TO RELATED APPLICATIONS

This application claims benefit of U.S. Provisional Application No. 63/477,122, filed Dec. 23, 2022, the entire disclosure of which is herein incorporated by reference for all purposes.

FIELD OF THE DISCLOSURE

This relates generally to systems and methods for providing a virtualized operating environment on electronic devices.

BACKGROUND OF THE DISCLOSURE

Some computer graphical environments provide two-dimensional and/or three-dimensional environments where at least some objects displayed for a user's viewing are generated using computer graphics. In some uses, a user may create or modify virtual experiences (e.g., objects or environments associated with applications configured to operate on an electronic device configured to present such objects or environments).

SUMMARY OF THE DISCLOSURE

In some embodiments, creating and/or modifying virtual experiences may include testing one or more features of the virtual experiences, such as evaluating one or more actions of a virtual object within a computer-generated environment. In some instances, it may be desirable to provide a testing environment in two dimensions (e.g., on a two-dimensional display of the electronic device in which the testing environment is provided) to efficiently evaluate virtual experiences without requiring a user to interact with the virtual experiences in three dimensions (e.g., via an electronic device that is configured to present a three-dimensional computer-generated environment).

Some embodiments of the disclosure are directed to systems and methods for a virtualized system on an electronic device. In some embodiments, a simulator application that includes a guest operating system is provided on an electronic device. In some embodiments, the simulator application provides a testing environment for a virtual experience of a secondary application that is in communication with the guest operating system. In some embodiments, the electronic device displays a user interface associated with the simulator application, the user interface including a computer-generated environment and a first object. In some embodiments, the electronic device renders the computer-generated environment based on scene data received from a host operating system of the electronic device. In some embodiments, while displaying the user interface, the electronic device receives a first input that corresponds to a request to cause the first object to perform a respective operation in the computer-generated environment. In some embodiments, in response to receiving the first input, the electronic device causes the first object to perform a first operation based on the first input and updates the computer-generated environment based on the first operation.

In some embodiments, while displaying the user interface that includes the computer-generated environment and the first object, the host operating system of the electronic device receives first data, from the guest operating system, corresponding to a request to cause the first object to perform a respective operation in the computer-generated environment. In some embodiments, in response to receiving the first data, the electronic device causes the first object to perform a first operation based on the first data and updates the computer-generated environment based on the first operation.

The full descriptions of these embodiments are provided in the Drawings and the Detailed Description, and it is understood that this Summary does not limit the scope of the disclosure in any way.

BRIEF DESCRIPTION OF THE DRAWINGS

For improved understanding of the various embodiments described herein, reference should be made to the Detailed Description below along with the following drawings. Like reference numerals often refer to corresponding parts throughout the drawings.

DETAILED DESCRIPTION

Some embodiments of the disclosure are directed to systems and methods for a virtualized system on an electronic device. In some embodiments, a simulator application that includes a guest operating system is provided on an electronic device. In some embodiments, the simulator application provides a testing environment for a virtual experience of a secondary application that is in communication with the guest operating system. In some embodiments, the electronic device displays a user interface associated with the simulator application, the user interface including a computer-generated environment and a first object. In some embodiments, the electronic device renders the computer-generated environment based on scene data received from a host operating system of the electronic device. In some embodiments, while displaying the user interface, the electronic device receives a first input that corresponds to a request to cause the first object to perform a respective operation in the computer-generated environment. In some embodiments, in response to receiving the first input, the electronic device causes the first object to perform a first operation based on the first input and updates the computer-generated environment based on the first operation.

In some embodiments, while displaying the user interface that includes the computer-generated environment and the first object, the host operating system of the electronic device receives first data, from the guest operating system, corresponding to a request to cause the first object to perform a respective operation in the computer-generated environment. In some embodiments, in response to receiving the first data, the electronic device causes the first object to perform a first operation based on the first data and updates the computer-generated environment based on the first operation.

Figure 1:
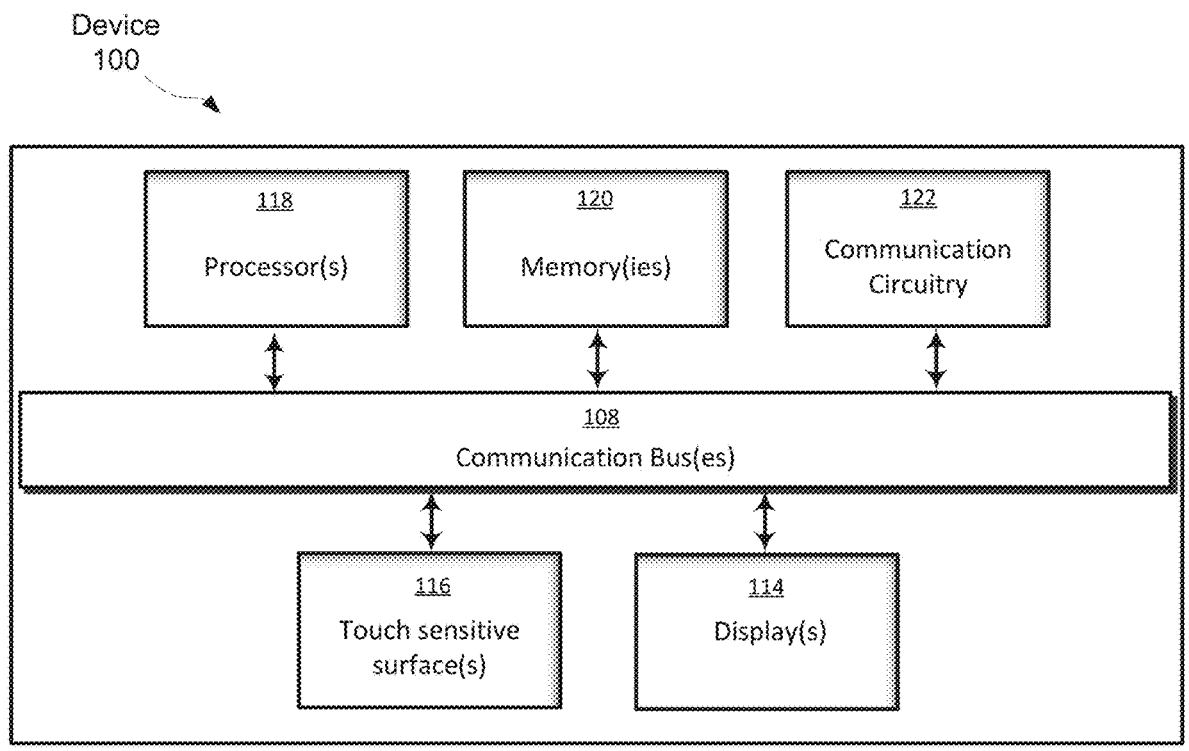
FIG. 1 is a block diagram illustrating an exemplary architecture for an electronic device according to some embodiments of the disclosure.

FIG. 1 is a block diagram illustrating an exemplary architecture for an electronic device according to some embodiments of the disclosure. In some examples, electronic device 100 includes one or more electronic devices. For example, the electronic device 100 may be a portable device, such as a mobile phone, smart phone, a tablet computer, a laptop computer, an auxiliary device in communication with another device, a head-mounted display, etc., respectively.

Exemplary electronic device 100 optionally includes one or more touch-sensitive surface(s) 116, one or more display generation component(s) or display(s) 114, one or more processor(s) 118, one or more memories 120, and/or communication circuitry 122. One or more communication buses 108 are optionally used for communication between the above-mentioned components of electronic device 100. Additionally, in some embodiments, the electronic device 100 may include various sensors not illustrated in FIG. 1, such as one or more image sensor(s), and/or one or more microphone(s) or other audio sensors, and/or one or more speaker(s).

Communication circuitry 122 optionally includes circuitry for communicating with electronic devices, networks, such as the Internet, intranets, a wired network and/or a wireless network, cellular networks, and wireless local area networks (LANs). Communication circuitry 122 optionally includes circuitry for communicating using near-field communication (NFC) and/or short-range communication, such as Bluetooth®.

Processor(s) 118 include one or more general processors, one or more graphics processors, and/or one or more digital signal processors. In some embodiments, memory 120 is a non-transitory computer-readable storage medium (e.g., flash memory, random access memory, or other volatile or non-volatile memory or storage) that stores computer-readable instructions configured to be executed by processor(s) 118 to perform the techniques, processes, and/or methods described below. In some embodiments, memory 120 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some embodiments, display generation component(s) or display(s) 114 include a single display (e.g., a liquid-crystal display (LCD), organic light-emitting diode (OLED), or other types of display). In some embodiments, display generation component(s) 114 includes multiple displays. In some embodiments, display generation component(s) 114 can include a display with touch capability (e.g., a touch screen), a projector, a holographic projector, a retinal projector, etc. In some embodiments, electronic device 100 includes touch-sensitive surface(s) 116, respectively, for receiving user inputs, such as tap inputs and swipe inputs or other gestures. In some embodiments, display generation component(s) 114 and touch-sensitive surface(s) 116 form touch-sensitive display(s) (e.g., a touch screen integrated with electronic device 100 or external to electronic device 100 that is in communication with electronic device 100).

In some embodiments, electronic device 100 includes microphone(s) or other audio sensors. Electronic device 100 optionally uses the microphone(s) to detect sound from the user and/or the real-world environment of the user. In some examples, the microphone(s) includes an array of microphones (a plurality of microphones) that optionally operate in tandem, such as to identify ambient noise or to locate the source of sound in space of the real-world environment.

Electronic device 100 is not limited to the components and configuration of FIG. 1, but can include fewer, other, or additional components in multiple configurations. In some examples, device 100 can be implemented between two electronic devices (e.g., as a system). A person or persons using electronic device 100, is optionally referred to herein as a user or users of the device.

Figure 2:
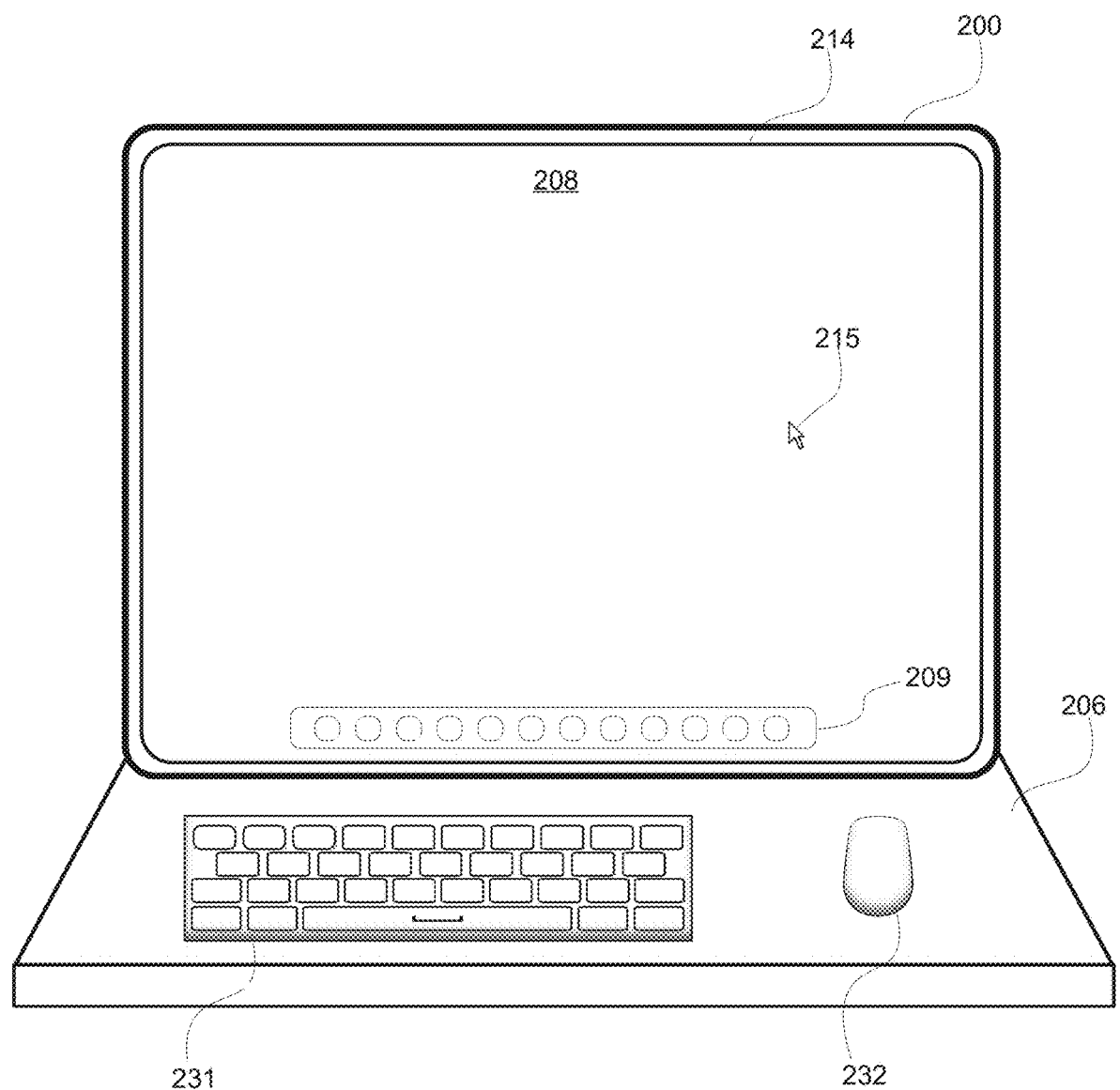
FIG. 2 illustrates an example of an electronic device according to some embodiments of the disclosure.

FIG. 2 illustrates an example of an electronic device according to some embodiments of the disclosure. In some embodiments, electronic device 200 is a desktop computer. In some embodiments, electronic device 200 is alternatively a hand-held or mobile device, such as a tablet computer, laptop computer, or smartphone. In some embodiments, the electronic device 200 corresponds to electronic device 100 described above with reference to FIG. 1.

As shown in FIG. 2, the electronic device 200 may be located in a physical environment that is surrounding a user of the electronic device 200. The physical environment may include physical features such as a physical surface (e.g., floor, walls) or a physical object (e.g., table, lamp, etc.). In some embodiments, electronic device 200 is positioned atop a surface of table 206 in the physical environment, as shown in FIG. 2.

In the discussion that follows, an electronic device that is in communication with a display and one or more input devices is described. For example, with reference to FIG. 2, the electronic device 200 optionally is in communication with a display and one or more other physical user-interface devices, such as a touch-sensitive surface, a physical keyboard, a mouse, a joystick, a stylus, etc. As shown in FIG. 2, the electronic device 200 may be in communication with display 214 (e.g., integrated with electronic device 200), keyboard 231 and mouse 232. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

In some embodiments, as shown in FIG. 2, the electronic device 200 displays user interface 208 (e.g., displayed via display 214). For example, the user interface 208 optionally includes a home screen (e.g., background desktop) and/or one or more applications or files (e.g., represented by icons in dock 209) that are optionally running or configured to be run on the electronic device 200, such as the applications described above. As shown in the example of FIG. 2, the user interface 208 may also include cursor 215. In some embodiments, the cursor 215 may be controllable via the mouse 232 for selecting and/or moving elements displayed in the user interface 208. It should be understood that the user interface elements (e.g., cursor 215 and/or icons within dock 209) of FIG. 2 are merely representative, and that additional, fewer, or different user interface elements may be included within user interface 208. Additionally, the user interface elements may include additional or alternative visual characteristics (e.g., different shapes, objects, symbols, text, number and the like). Additionally or alternatively, for example, the icons within the dock 209 may represent any object corresponding to data (e.g., data files, shortcuts, hyperlinks, images, photographs, etc.) stored on the electronic device 200 (e.g., stored in memory or memories 120 in FIG. 1).

In some embodiments, the electronic device 200 is configurable to run a simulator application. For example, the electronic device 200 may display a user interface associated with the simulator application running on the electronic device 200. In some embodiments, the simulator application provides a testing environment for testing (e.g., evaluating) a virtual experience. For example, as discussed herein, the simulator application enables a user (e.g., a content creator and/or designer) to simulate a virtual experience that includes one or more virtual objects (e.g., three-dimensional and/or two-dimensional objects) configurable to be displayed in a computer-generated three-dimensional environment in two dimensions (e.g., via the two-dimensional display 214 of the electronic device 200). In some embodiments, as described in more detail below, the simulator application provides data to the display 214 to display one or more virtual objects in a respective computer-generated environment within a user interface associated with the simulator application, wherein interactions involving the one or more virtual objects within the respective computer-generated environment simulates interactions of the one or more virtual objects in a three-dimensional computer-generated environment (e.g., presented via an electronic device that is different from the electronic device 200, such as a head-mounted display).

Attention is now directed towards interactions with one or more virtual objects that are displayed in a three-dimensional environment presented at an electronic device (e.g., corresponding to electronic device 201) in one or more orientations. As discussed below, the one or more virtual objects may be displayed in the three-dimensional environment in a body locked orientation, a head locked orientation, tilt locked, and/or a world locked orientation. In some examples, the electronic device selectively moves the one or more virtual objects in the three-dimensional environment in response to detecting movement of a viewpoint of a user of the electronic device depending on the orientation in which the one or more virtual objects are displayed in the three-dimensional environment. As described below, movement of the viewpoint of the user optionally causes the display generation component (e.g., display generation component(s) 214) to move within the physical environment surrounding the electronic device, which causes the portion of the physical environment and/or the three-dimensional environment displayed via the display generation component to be updated in accordance with the movement of the viewpoint.

Figure 3A:
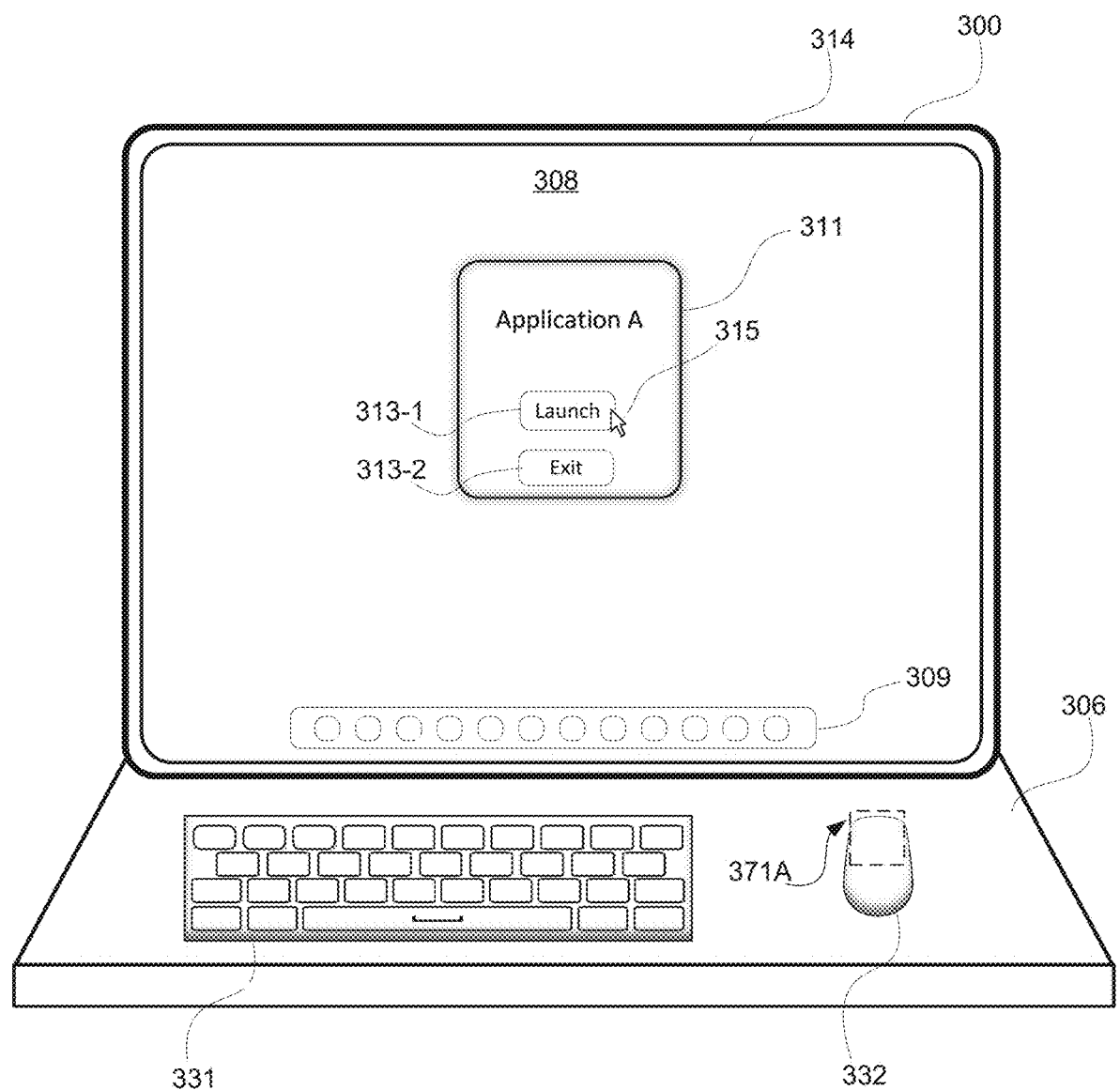
FIGS. 3A-3K illustrate example interactions involving one or more objects within a simulator application operating on an electronic device according to some embodiments of the disclosure.

FIGS. 3A-3K illustrate example interactions involving one or more objects within a simulator application operating on an electronic device according to some embodiments of the disclosure. In some embodiments, electronic device 300 may correspond to electronic device 200 in FIG. 2 and/or electronic device 100 in FIG. 1. In some embodiments, as shown in FIG. 3A, the electronic device 300 is in communication with one or more input devices, such as keyboard 331 and/or mouse 332. In some embodiments, the cursor 315 may be configured to receive input for controlling cursor 315 displayed on display 314 of the electronic device 300. Additionally, as shown in FIG. 3A, the electronic device 300, the keyboard 331 and the mouse 332 may be positioned atop real-world table 306.

In some embodiments, as shown in FIG. 3A, the electronic device 300 may present user interface 308, which may be a home screen or desktop user interface of the electronic device 300. For example, the user interface 308 includes dock 309 that includes a plurality of user interface objects (e.g., icons) associated with applications, files, etc. In some embodiments, the user interface 308 corresponds to user interface 208 described above with reference to FIG. 2.

In some embodiments, as previously mentioned above, the electronic device 300 may be configured to operate a simulator application that provides a testing environment for three-dimensional virtual experiences in two dimensions. For example, as shown in FIG. 3A, the electronic device 300 is displaying application window 311 that is associated with the simulator application ("Application A"). Specifically, as shown in FIG. 3A, the application window 311 may include a first option 313-1 that is selectable to launch the simulator application (e.g., display a user interface associated with the simulator application, as described in more detail below) and a second option 313-2 that is selectable to close (e.g., cease displaying) the application window 311 in the user interface 308.

In FIG. 3A, the electronic device 300 optionally receives an input corresponding to a request to launch the simulator application on the electronic device 300. For example, as shown in FIG. 3A, the electronic device 300 detects a selection input 371A (e.g., a click or press) via the mouse 332 while the cursor 315 is positioned over the first option 313-1 in the application window 311. In some embodiments, in response to receiving the selection of the first option 313-1, the electronic device 300 launches the simulator application. For example, as shown in FIG. 3B, the electronic device 300 displays simulation user interface 312 using the display 314.

Figure 3B:
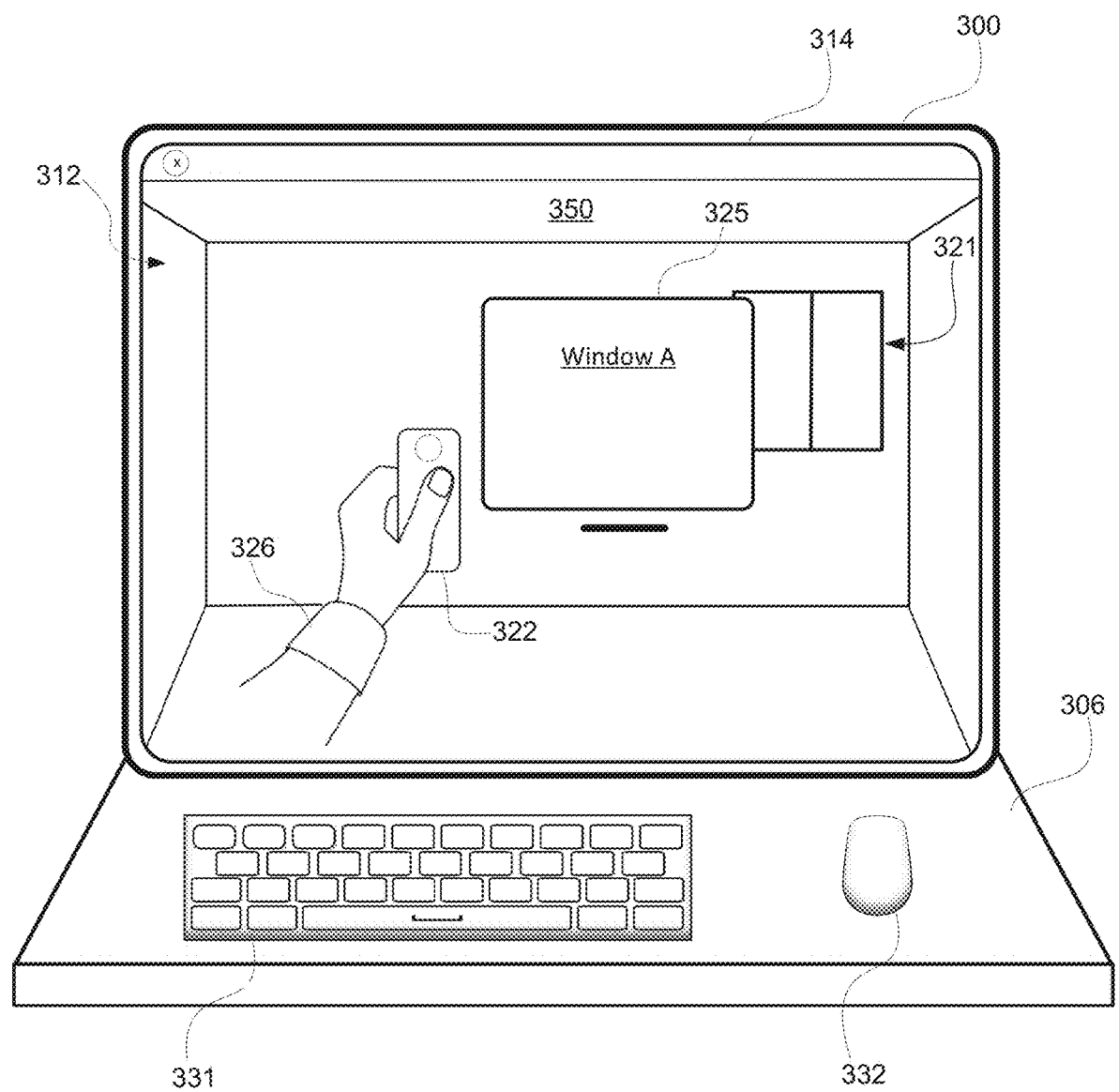

In some embodiments, as shown in FIG. 3B, the simulation user interface 312 includes a computer-generated environment 350. For example, the computer-generated environment 350 corresponds to a virtual three-dimensional environment that is rendered in two dimensions on the display 314. In some embodiments, the computer-generated environment 350 is a predetermined environment that is automatically selected for display in the simulation user interface 312 by the electronic device 300. In some embodiments, as described in more detail below, the computer-generated environment 350 is selected for display in the simulation user interface 312 by a user of the electronic device 300.

In some embodiments, the computer-generated environment 350 is rendered for display in the simulation user interface 312 based on scene configuration data provided by a host operating system of the electronic device 300. For example, as discussed herein, the host operating system provides the scene configuration data to the simulator application, and the scene configuration data is stored in memory (e.g., such as memory 120 in FIG. 1). It should be understood that, alternatively, in some embodiments, the scene configuration data is sourced from alternative sources, such as wirelessly from an external source like a second electronic device or cloud-based storage. In some embodiments, the scene configuration data is received by a guest operating system of the simulator application. In some embodiments, as discussed in more detail later, the guest operating system utilizes the scene configuration data to generate and display the computer-generated environment 350 in the simulation user interface 312.

In some embodiments, as shown in FIG. 3B, the simulation user interface 312 also includes one or more virtual objects. In some embodiments, the one or more virtual objects may include virtual representation of a respective user that is different from the user of the electronic device 300. For example, as shown in FIG. 3B, the simulation user interface 312 includes a virtual representation of a hand 326 of a respective user. In some embodiments, as discussed in more detail below, the hand 326 is controllable via input received on the keyboard 331 and/or the mouse 332. In some embodiments, the hand 326 may include a virtual representation of an input device, such as controller 322, as shown in FIG. 3B. Additionally, as shown in FIG. 3B, the simulation user interface 312 includes application window 325 ("Window A"), which is displayed within the computer-generated environment 350. In some embodiments, the application window 325 is or includes content, such as video or image content, web-based content, textual content, etc. For example, the application window 325 is associated with a secondary application (e.g., a client application, such as a content provider application under test) that is running within the simulator application, as discussed in more detail later. In some embodiments, as discussed in more detail below, the electronic device 300 renders the application window 325 based on application data received from the simulation application.

As discussed herein, the simulation application may provide a testing environment for evaluating one or more functions of a three-dimensional virtual experience in two dimensions. For example, in FIG. 3B, the simulation application simulates interactions of a respective user in a computer-generated environment that includes a virtual object (such as application window 325). As discussed below, the user of the electronic device 300 may control interactions of the hand 326 within the computer-generated environment 350 to evaluate operation of the application window 325 (e.g., operation of the secondary application with which the application window 325 is associated) or some other portion of the computer-generated environment 350. In some embodiments, as described herein, the computer-generated environment 350 is interpreted by the guest operating system of the simulation application, as a real-world (e.g., physical) environment that is surrounding the respective user (e.g., to whom the hand 326 belongs). Testing the behaviors in the two-dimensional context of the simulation application enables the user of the electronic device 300 (e.g., a designer or content creator) to modify and improve the performance of the application window 325, such that when the application window 325 (or similar virtual object) is presented in a three-dimensional computer-generated environment using a different electronic device, the application window 325 may be responsive to user interactions in an effective and desired manner.

In some embodiments, as shown in FIG. 3B, the simulation application tests the secondary application with which the application window 325 is associated relative to a viewpoint of the respective user (e.g., to whom the hand 326 belongs). For example, the computer-generated environment 350 may correspond to a physical environment that is surrounding the respective user. As shown in FIG. 3B, the physical environment may be a room in which the respective user is located, which includes representations of walls, ceiling, and floor as well as window 321. In some embodiments, the portion of the computer-generated environment 350 that is displayed in the simulation user interface 312 may be defined by X, Y and Z axes as viewed from the viewpoint of the respective user. For example, the view of the computer-generated environment 350 that is displayed in the simulation user interface 312 is defined based on a perspective of a respective electronic device (e.g., a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses)), different from the electronic device 300, that would be used to generated and present the computer-generated environment 350 in three dimensions. Specifically, in FIG. 3B, the simulation application is displaying the computer-generated environment 350 as would be viewed from the perspective of a respective electronic device that is worn on the respective user's head.

Figure 3C:
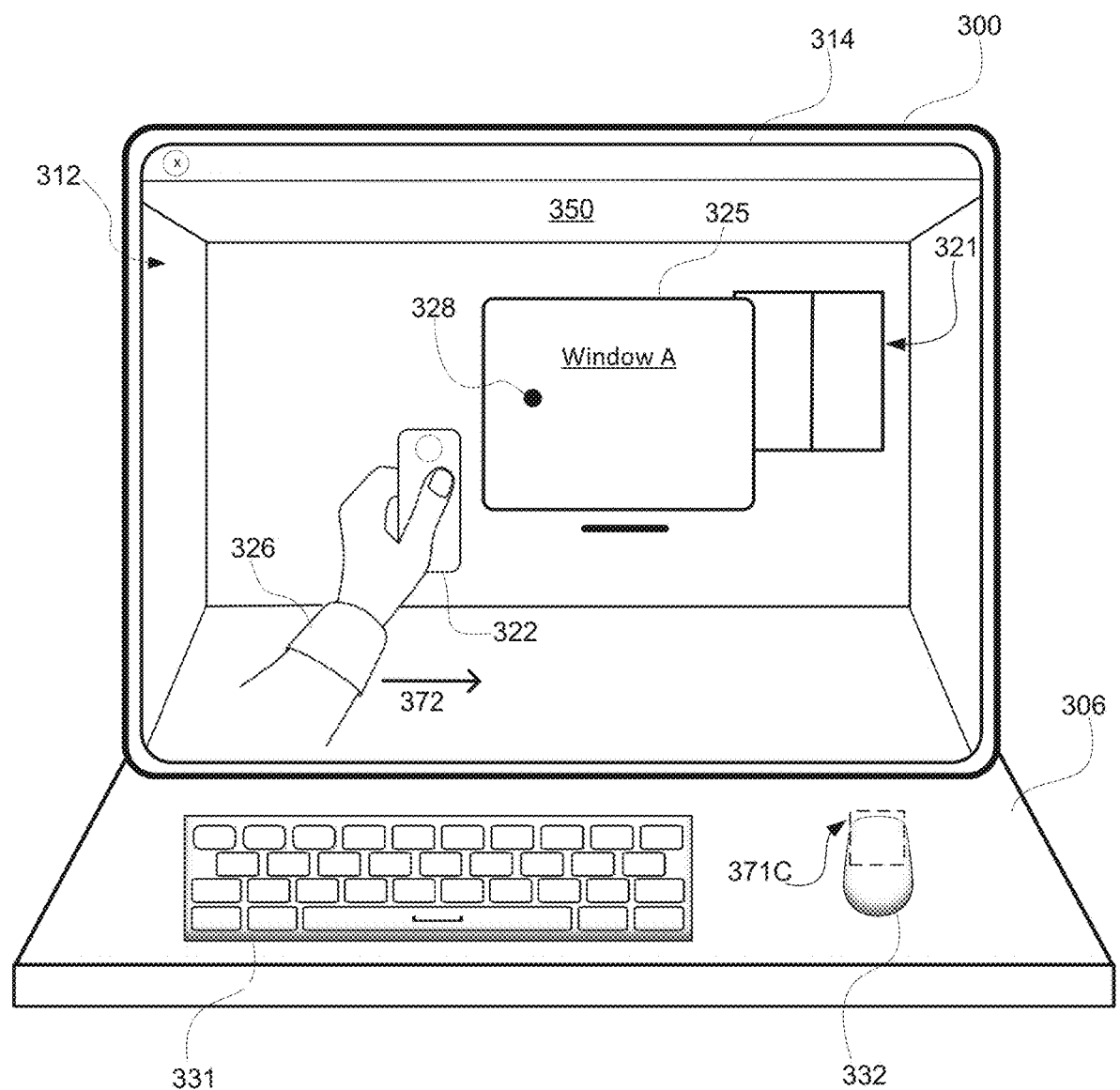

In some embodiments, the simulation application may enable the user of the electronic device 300 to test (e.g., evaluate performance of) movement of the application window 325 within the computer-generated environment 350. For example, as shown in FIG. 3B, the user of the electronic device 300 may provide input on the keyboard 331 and/or the mouse 332 that corresponds to input provided by the hand 326 for moving the application window 325 within the computer-generated environment 350. As shown in FIG. 3C, the electronic device 300 optionally detects input 371C on the mouse 332 (e.g., a press or click on the mouse 332, followed by movement of the mouse 332) that corresponds to input provided by the hand 326 for moving the application window 325 rightward (e.g., represented by arrow 372) in the computer-generated environment 350. For example, if the application window 325 were displayed in a three-dimensional computer-generated environment presented at an electronic device different from the electronic device 300, the input 371C simulates an input provided by hand 326 that is optionally detected via the controller 322 (or some other input device) while a gaze of the respective user (e.g., represented by circle 328) is directed to the application window 325. In some embodiments, a simulation of a location of the gaze of the respective user (e.g., represented by circle 328) in the computer-generated environment 350 is controllable (like a cursor) via the mouse 332.

In some embodiments, as described herein, when the electronic device 300 receives the input 371C detected via the one or more input devices (e.g., the mouse 332), the host operating system of the electronic device 300 converts first input data corresponding to the input 371C to second input data that is transmitted to the guest operating system of the simulation application. In some embodiments, the second input data includes information indicating that the hand 326 of the respective user has provided input (e.g., via controller 322) for moving the application window 325 rightward in the computer-generated environment 350. Accordingly, the input received by the guest operating system of the simulation application is different from the input 371C detected via the one or more input devices of the electronic device 300.

Figure 3D:
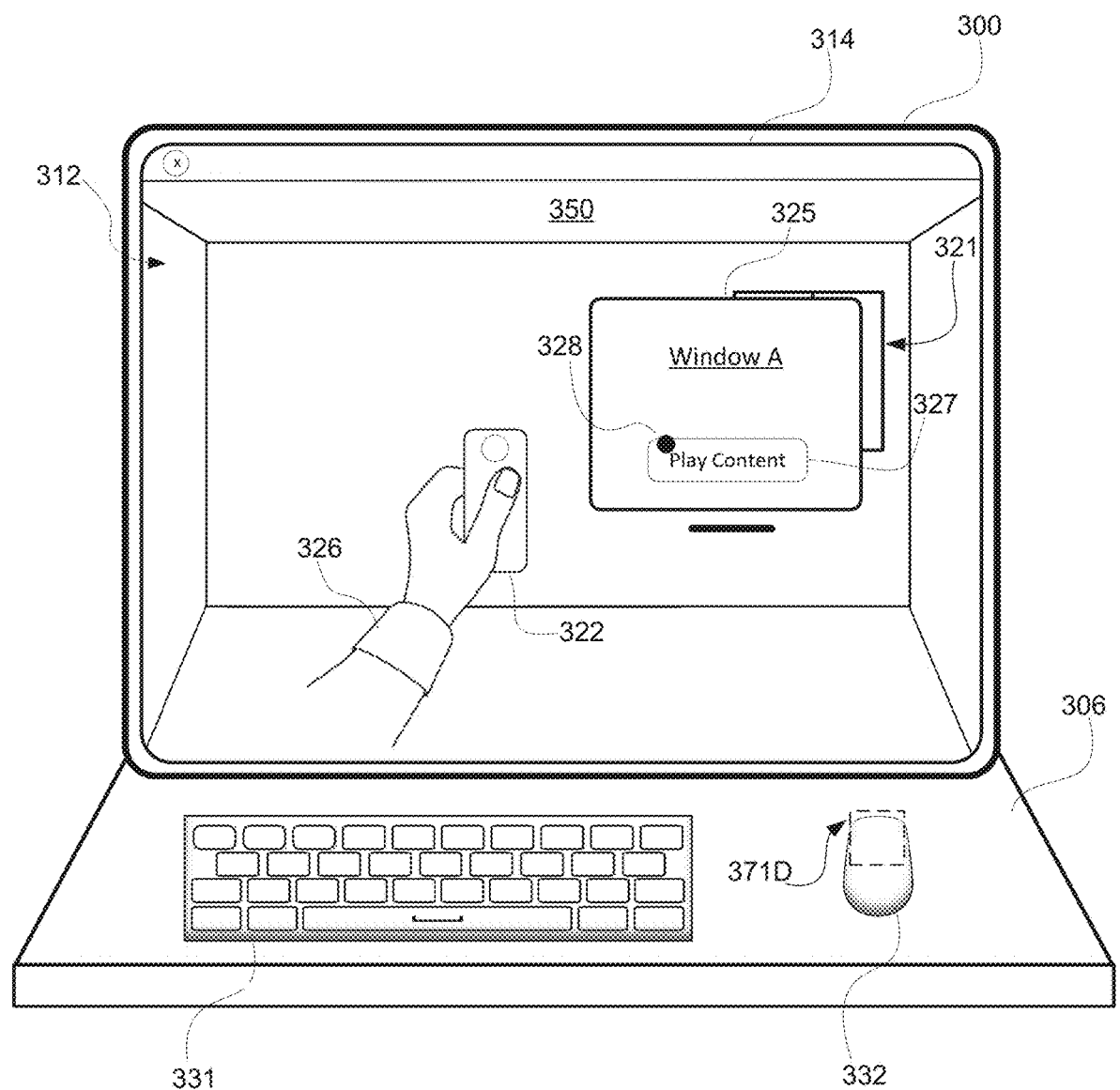

In some embodiments, as shown in FIG. 3D, in response to receiving the input 371C, the electronic device 300 updates, via the display 314, display of the simulation user interface 312. For example, as shown in FIG. 3D, the electronic device 300 moves the application window 325 rightward in the computer-generated environment 350 based on the input 371C received via the mouse 332 (e.g., which corresponds to the input provided by the hand 326 of the respective user). As shown in FIG. 3D, because the application window 325 moved rightward in the computer-generated environment 350 as directed by the input 371C detected via the mouse 332, the movement functionality of the application window 325 is performed as expected (e.g., as desired). Accordingly, when the application window 325 (or similar virtual object) is displayed in a three-dimensional computer-generated environment using a respective electronic device that is different from the electronic device 300, if the respective electronic device detects input similar to the input provided by the hand 326 (e.g., via the controller 322), the application window 325 would be moved rightward in the three-dimensional computer-generated environment as similarly shown in FIG. 3D. Thus, as discussed herein, providing the simulation application enables the user (e.g., a content creator and/or designer) to receive feedback regarding the performance of the application window 325 in a three-dimensional computer-generated environment, as well as a user experience of a respective user (e.g., the user to whom the hand 326 belongs), as one advantage.

In some embodiments, when the guest operating system of the simulation application receives the second input data described above from the host operating system of the electronic device 300, the guest operating system transmits synthetic input data that is based on the second input data to the secondary application with which the application window 325 is associated. In some embodiments, the secondary application updates the application data associated with the application window 325 based on the synthetic input data. For example, the secondary application updates position information associated with the application window 325 that determines a relative location at which the application window 325 is displayed in the computer-generated environment 350 in the simulation user interface 312. In some embodiments, the guest operating system receives the updated application data from the secondary application and then transmits synthetic output data (e.g., that is based on the updated application data) to the host operating system of the electronic device 300. In some embodiments, in response to receiving the synthetic output data, the host operating system updates the scene configuration data, and provides the updated scene configuration data to the display 314, which causes the application window 325 to move rightward in the computer-generated environment 350 as shown in FIG. 3D.

In some embodiments, the simulation application may enable the user of the electronic device 300 to test (e.g., evaluate performance of) selection of a selectable option of the application window 325 within the computer-generated environment 350. For example, as shown in FIG. 3D, the application window 325 may include play option 327 that is selectable to initiate playback of content (e.g., video content, music content, etc.) in the application window 325. As shown in FIG. 3D, the user of the electronic device 300 may provide input on the keyboard 331 and/or the mouse 332 that corresponds to input provided by the hand 326 for selecting the play option 327 of the application window 325 within the computer-generated environment 350. As shown in FIG. 3C, the electronic device 300 optionally detects input 371D on the mouse 332 (e.g., a press or click on the mouse 332) that corresponds to input provided by the hand 326 for selecting the play option 327. For example, if the application window 325 including the play option 327 were displayed in a three-dimensional computer-generated environment presented at an electronic device that is different from the electronic device 300, the input 371D simulates an input provided by hand 326 that is optionally detected via the controller 322 (or some other input device) while the gaze of the respective user (e.g., represented by circle 328) is directed to the play option 327.

Figure 3E:
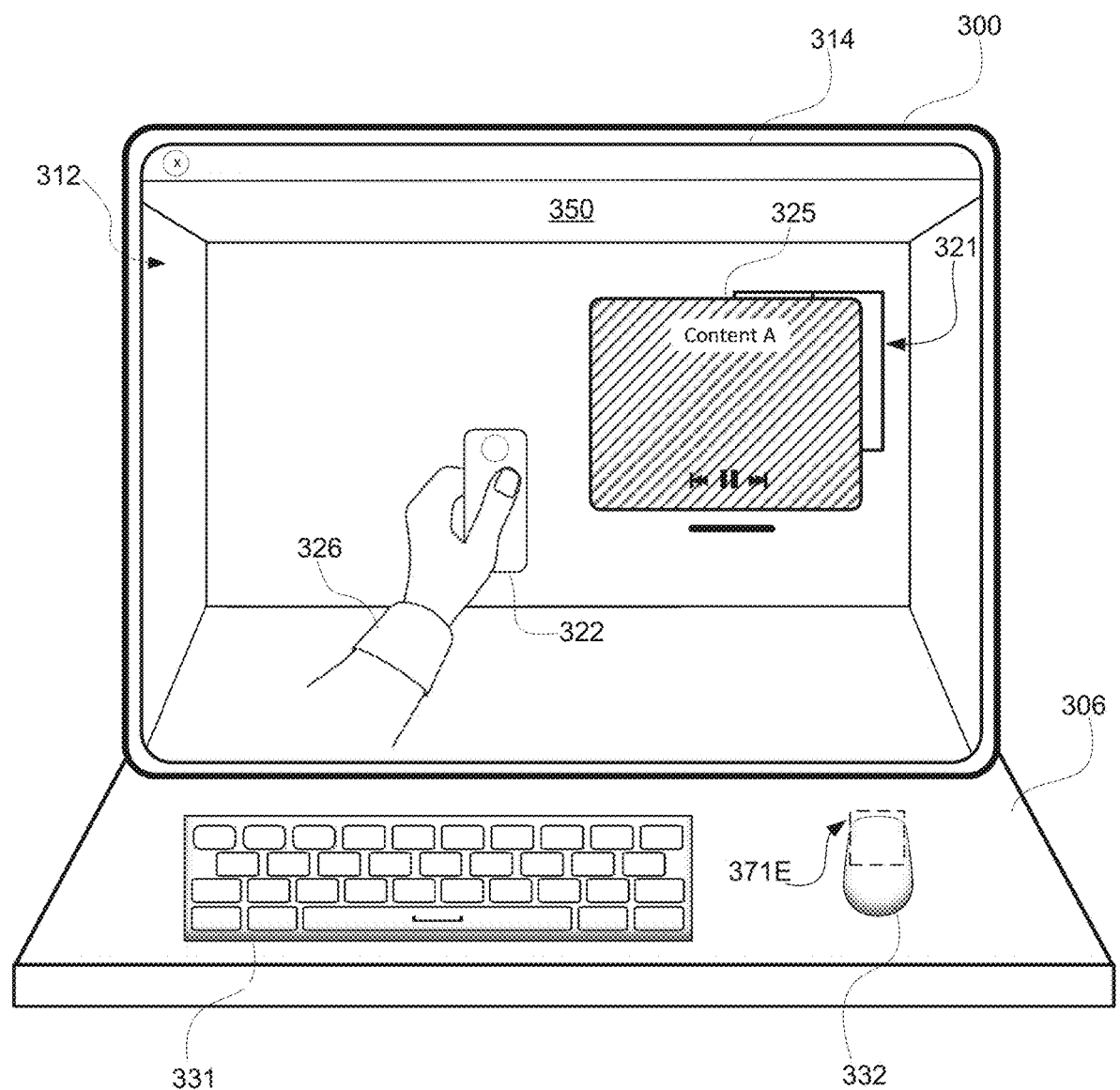

In some embodiments, in response to receiving the input 371D, the electronic device 300 causes the simulation application to initiate playback of content ("Content A") within the application window 325 in the computer-generated environment 350, as shown in FIG. 3E. For example, as shown in FIG. 3E, video content is displayed in the application window 325 in the computer-generated environment 350. As similarly described above, when the electronic device 300 receives the input 371D via the mouse 332 in FIG. 3D, the electronic device 300 optionally converts first input data corresponding to the input 371D to second input data that is interpreted by the guest operating system of the simulation application as input provided by the hand 326 (e.g., detected via the controller 322) for selecting the play option 327. In some embodiments, when the guest operating system receives the second input data, as similarly discussed above, secondary application updates the application data associated with the application window 325. In some embodiments, the secondary application updates the application data, which is transmitted back to the host operating system via synthetic output data that includes instructions for causing the electronic device 300 to update display of the application window 325 via the display 314 and initiate playback of the video content ("Content A") as shown in FIG. 3E.

Accordingly, as shown in FIG. 3E, because video content was displayed in the application window 325 in the computer-generated environment 350 as directed by the input 371D detected via the mouse 332, the selection functionality of the application window 325 is performed as expected (e.g., as desired). Thus, when the application window 325 (or similar virtual object) is displayed in a three-dimensional computer-generated environment using a respective electronic device that is different from the electronic device 300, if the respective electronic device detects input similar to the input provided by the hand 326 (e.g., via the controller 322), the application window 325 would display video content in the three-dimensional computer-generated environment as similarly shown in FIG. 3E.

In some embodiments, the simulation application may enable the user of the electronic device 300 to test (e.g., evaluate performance of) display of the application window 325 within the computer-generated environment 350 when the viewpoint of the respective user (e.g., different from the user of the electronic device 300) changes. For example, as shown in FIG. 3E, the user of the electronic device 300 may provide input on the keyboard 331 and/or the mouse 332 that corresponds to input provided by the hand 326 for shifting the viewpoint of the respective user (e.g., to whom the hand 326 belongs) within the computer-generated environment 350. As shown in FIG. 3E, the electronic device 300 optionally detects input 371E on the mouse 332 (e.g., a press or click on the mouse 332, followed by movement of the mouse 332) that corresponds to movement of the viewpoint of the respective user. For example, if a three-dimensional computer-generated environment including the application window 325 were presented at an electronic device that is different from the electronic device 300, the input 371E simulate movement of the electronic device (e.g., optionally worn by the respective user) that causes the perspective of the electronic device to change relative to the three-dimensional computer-generated environment.

Figure 3F:
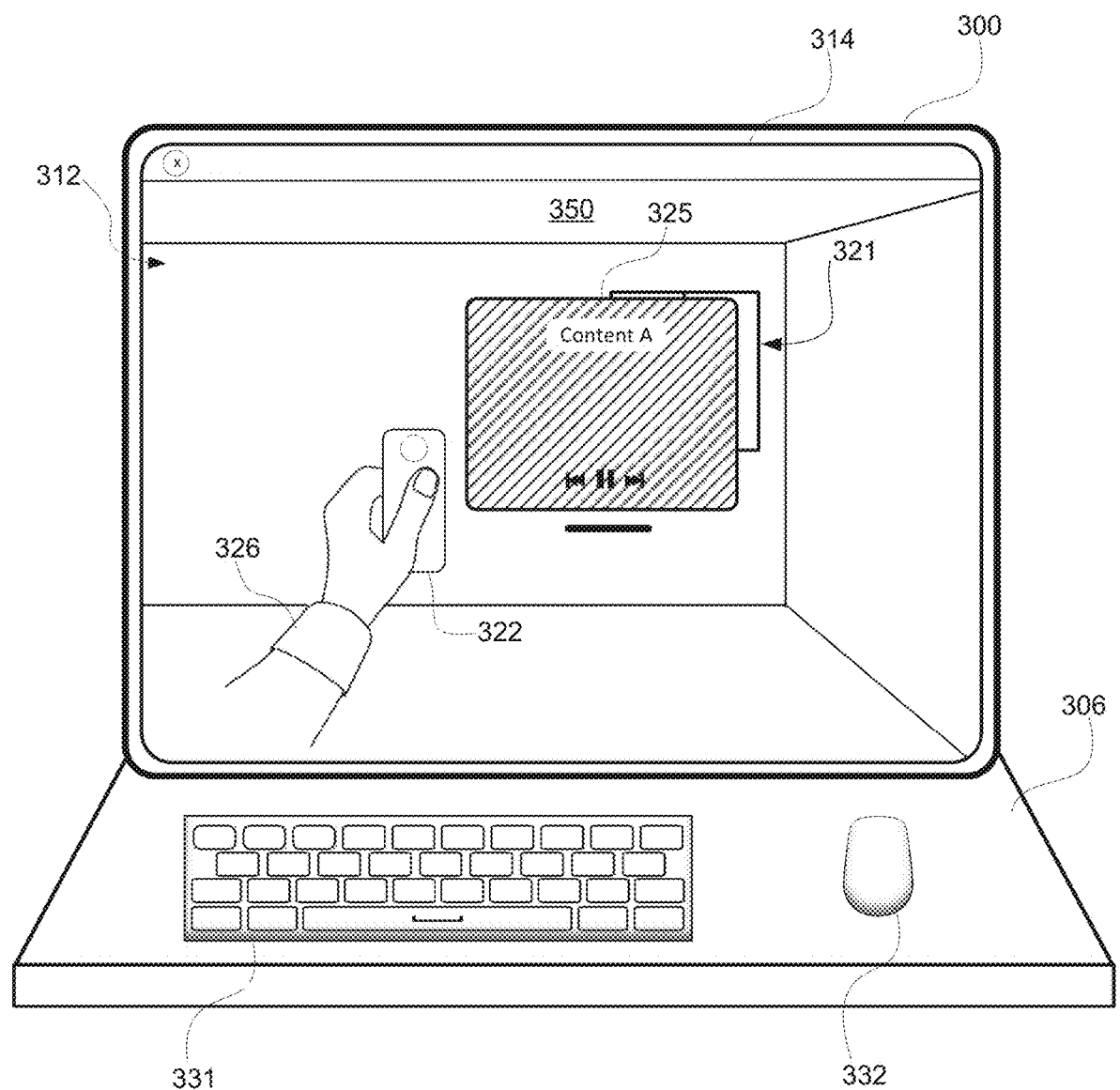

In some embodiments, in response to receiving the input 371E, the electronic device 300 updates display of the computer-generated environment 350 based on the movement of the viewpoint of the respective user, as shown in FIG. 3F. For example, as shown in FIG. 3F, the viewpoint of the respective user has shifted rightward, which causes the portion of the computer-generated environment 350 that is displayed in the simulation user interface 312 to shift to the left, including the application window 325. In some embodiments, as shown in FIG. 3F, additional portions of the computer-generated environment 350 are displayed in the simulation user interface 312 in response to receiving the input 371E, such as additional portions of the right-side wall of the room in which the respective user (e.g., to whom the hand 326 belongs) is located (per the simulation). As similarly described above, when the electronic device 300 receives the input 371E via the mouse 332 in FIG. 3E, the electronic device 300 optionally converts first input data corresponding to the input 371E to second input data that is interpreted by the guest operating system of the simulation application as input provided by the respective user for moving the viewpoint. In some embodiments, when the guest operating system receives the second input data, as similarly discussed above, the secondary application updates the application data associated with the application window 325. In some embodiments, the secondary application transmits the updated the application data to the guest operating system, and the guest operating system transmits synthetic output data that includes instructions for causing the electronic device 300 to update display of the application window 325 via the display 314 and shift the application window 325 leftward with the portions of the computer-generated environment that are displayed in the simulation user interface 312 as shown in FIG. 3F.

Accordingly, as shown in FIG. 3F, because the application window 325 was shifted leftward with the computer-generated environment 350 as directed by the input 371E detected via the mouse 332, updating display of the application window based on a location of the viewpoint of the respective user is performed as expected (e.g., as desired). Thus, when the application window 325 (or similar virtual object) is displayed in a three-dimensional computer-generated environment using a respective electronic device that is different from the electronic device 300, if the respective electronic device detects movement of a viewpoint of a user of the respective electronic device (e.g., such as movement of a perspective of the respective electronic device) as similarly discussed above, the application window 325 would shift in the user's field of view based on the movement of the viewpoint as similarly shown in FIG. 3F. Additionally, simulating the display of the application window 325 based on shifting viewpoints using the simulation application may also test the behavior of the application window 325 relative to a three-dimensional computer-generated environment (e.g., relative to other objects in the three-dimensional computer-generated environment). For example, when a respective electronic device (e.g., different from the electronic device 300) is used to generated and present a three-dimensional computer-generated environment that includes the application window 325 (or similar virtual object), the respective electronic device may be configured to be movable with six degrees of freedom based on the movement of the user of the respective electronic device (e.g., the head of the user), such that the electronic device 301 may be moved in the roll direction, the pitch direction, and/or the yaw direction. In some such embodiments, if the application window 325 is configured to be displayed with a particular orientation, such as an orientation that causes the application window 325 to remain angled toward the viewpoint of the user irrespective of movement of the viewpoint, the simulation application running on the electronic device 300 enables the orientation of the application window 325 to be evaluated based on shifts in viewpoint in the manner similarly shown in FIG. 3F.

Additionally or alternatively, in some embodiments, the simulation application may provide a testing environment for evaluating a virtual experience that includes a user-controllable virtual agent. For example, with reference to FIG. 3G, the computer-generated environment 350 may alternatively include virtual agent 310, which optionally corresponds to a virtual character (e.g., an animated object). In some embodiments, as similarly discussed herein, the virtual agent 310 may be associated with a secondary application operating with the simulator application on the electronic device 300. In some embodiments, as similarly discussed above, one or more interactions of the virtual agent 310 may be driven via user input received on the one or more input devices in communication with the electronic device 300, such as the keyboard 331 and/or the mouse 332. In some embodiments, the simulation application may provide a testing environment for evaluating motion of the virtual agent 310 within a three-dimensional computer-generated environment by simulating motion of the virtual agent 310 within the computer-generated environment 350, as discussed below.

Figure 3G:
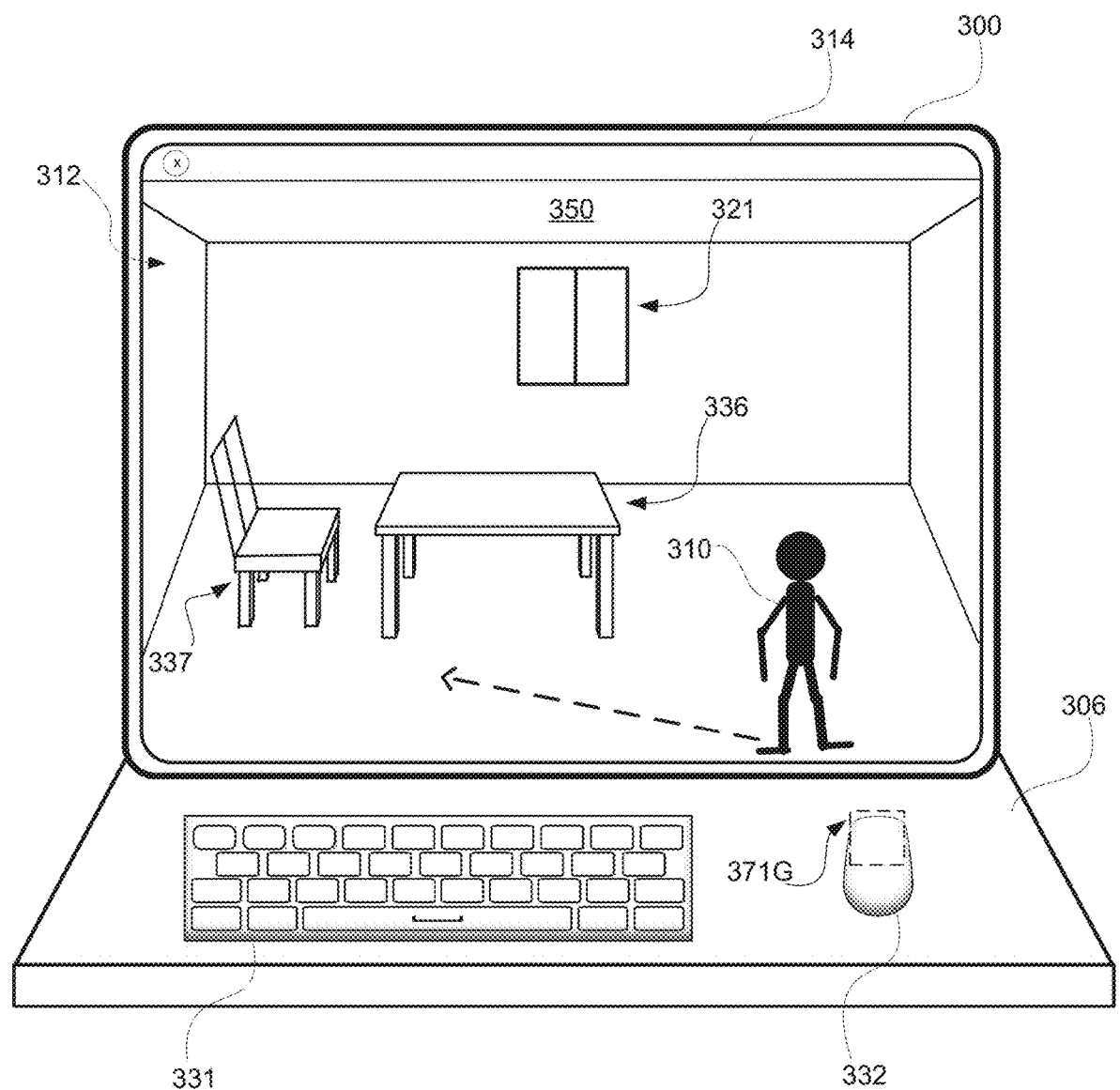

In FIG. 3G, the electronic device 300 optionally detects user input for causing the simulator application to initiate movement of the virtual agent 310 within the computer-generated environment 350. For example, as shown in FIG. 3G, the electronic device 300 detects input 371G via the mouse 332 (e.g., a press or click of the mouse 332, followed by movement of the mouse 332 on the table 306). In some embodiments, the electronic device 300 alternatively detects one or more presses on one or more keys of the keyboard 331 corresponding to a request to cause movement of the virtual agent 310 within the computer-generated environment 350. In some embodiments, as shown in FIG. 3G, the input 371G corresponds to a command provided by a respective user (e.g., different from the user of the electronic device 300) for causing the virtual agent 310 to move forward diagonally in the computer-generated environment 350. For example, if the virtual agent 310 were displayed in a three-dimensional computer-generated environment presented at a respective electronic device that is different from the electronic device 300 (e.g., such that the virtual agent 310 is presented within a virtual video game environment), the input 371G simulates an input provided by a respective user of the respective electronic device (optionally detected via a controller (or some other input device) in communication with the respective electronic device).

Figure 3H:
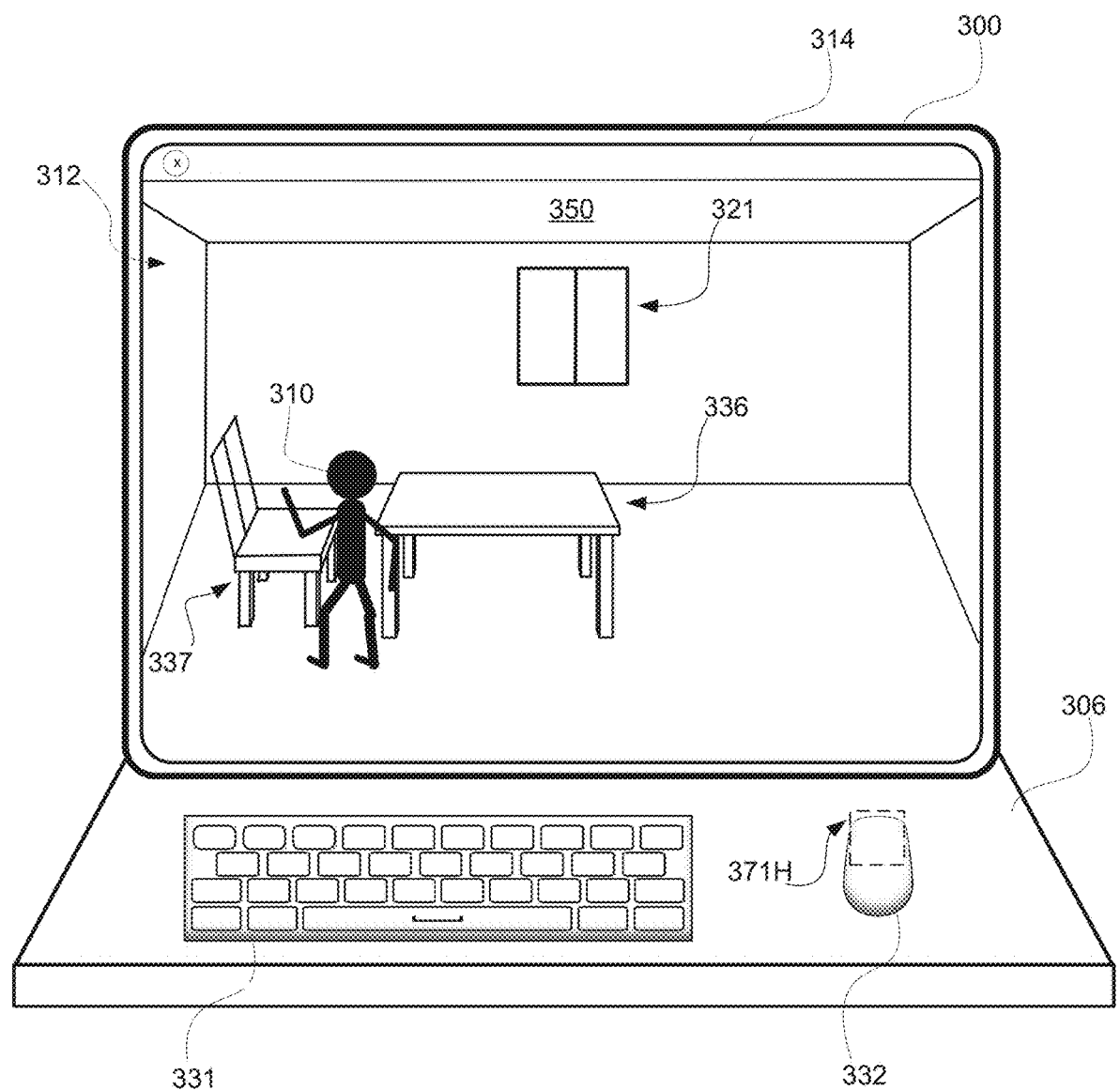

In some embodiments, as shown in FIG. 3H, in response to detecting the input 371G, the electronic device 300 causes the simulator application to move the virtual agent 310 within the computer-generated environment 350. For example, as shown in FIG. 3H, the virtual agent 310 has moved (e.g., walked) forward and leftward (e.g., diagonally) in the computer-generated environment 350. Accordingly, as shown in FIG. 3H, because the virtual agent 310 moved forward diagonally within the computer-generated environment 350 as directed by the input 371G detected via the mouse 332, the movement functionality of the virtual agent 310 performed as expected (e.g., as desired). Thus, when the virtual agent 310 (or similar virtual object) is displayed in a three-dimensional computer-generated environment using a respective electronic device that is different from the electronic device 300 (e.g., in a virtual video game scenario), if the respective electronic device detects an input corresponding to a request to cause movement of the virtual agent 310 as similarly discussed above, the virtual agent 310 would move within the three-dimensional computer-generated environment based on the movement of the viewpoint as similarly shown in FIG. 3H.

In some embodiments, as similarly discussed above, when the electronic device 300 receives the input 371G via the mouse 332 in FIG. 3G, the electronic device 300 optionally converts first input data corresponding to the input 371G to second input data that is interpreted by the guest operating system of the simulation application as input provided by a respective user (e.g., via a controller) for moving the virtual agent 310. In some embodiments, when the guest operating system receives the second input data, as similarly discussed above, the secondary application updates application data associated with the virtual agent 310. For example, the application data includes information corresponding to a position of the virtual agent 310 within the computer-generated environment 350, an orientation of the virtual agent 310 within the computer-generated environment 350, an animation of the virtual agent 310 (e.g., including movement of the virtual agent 310), etc. In some embodiments, the secondary application transmits the updated application data to the guest operating system, and the guest operating system transmits synthetic output data that includes instructions for causing the electronic device 300 to update display of the virtual agent 310 via the display 314 and move the virtual agent 310 forward and diagonally within the computer-generated environment as shown in FIG. 3H.

In some embodiments, the simulation application may enable the user of the electronic device 300 to test (e.g., evaluate a performance of) interactions between the virtual agent 310 and an object (e.g., a real-world or virtual object) in a three-dimensional computer-generated environment in two dimensions. As shown in FIGS. 3G-3H, the computer-generated environment 350 in the simulation user interface 312 may include one or more objects, such as table 336 and chair 337. In some embodiments, the table 336 and the chair 337 correspond to real-world (e.g., physical objects) in the computer-generated environment 350. In some embodiments, the table 336 and the chair 337 correspond to virtual objects (e.g., virtual renderings of a table and a chair) in the computer-generated environment 350. For example, as described in more detail later, the secondary application with which the virtual agent 310 is associated interprets the table 336 and the chair 337 as either real-world objects or virtual objects within the computer-generated environment 350.

As shown in FIG. 3H, when the virtual agent 310 completes the movement discussed above within the computer-generated environment 350, the virtual agent 310 is located at or near the chair 337 and/or the table 336. In some embodiments, the virtual agent 310 may be configured to interact with the chair 337 and/or the table 336 in the computer-generated environment 350. In FIG. 3H, the electronic device 300 detects input 371H for causing the virtual agent 310 to interact with the chair 337. In some embodiments, the electronic device 300 receives a click or press on the mouse 332 (e.g., while the cursor (315 in FIG. 3A) is directed to the chair 337) corresponding to a command provided by a respective user for causing the virtual agent 310 to sit in the chair 337 at the table 336. For example, if the virtual agent 310 were displayed in a three-dimensional computer-generated environment presented at a respective electronic device that is different from the electronic device 300 (e.g., such that the virtual agent 310 is presented within a virtual video game environment), the input 371H simulates an input provided by a respective user of the respective electronic device (optionally detected via a controller (or some other input device) in communication with the respective electronic device).

Figure 3I:
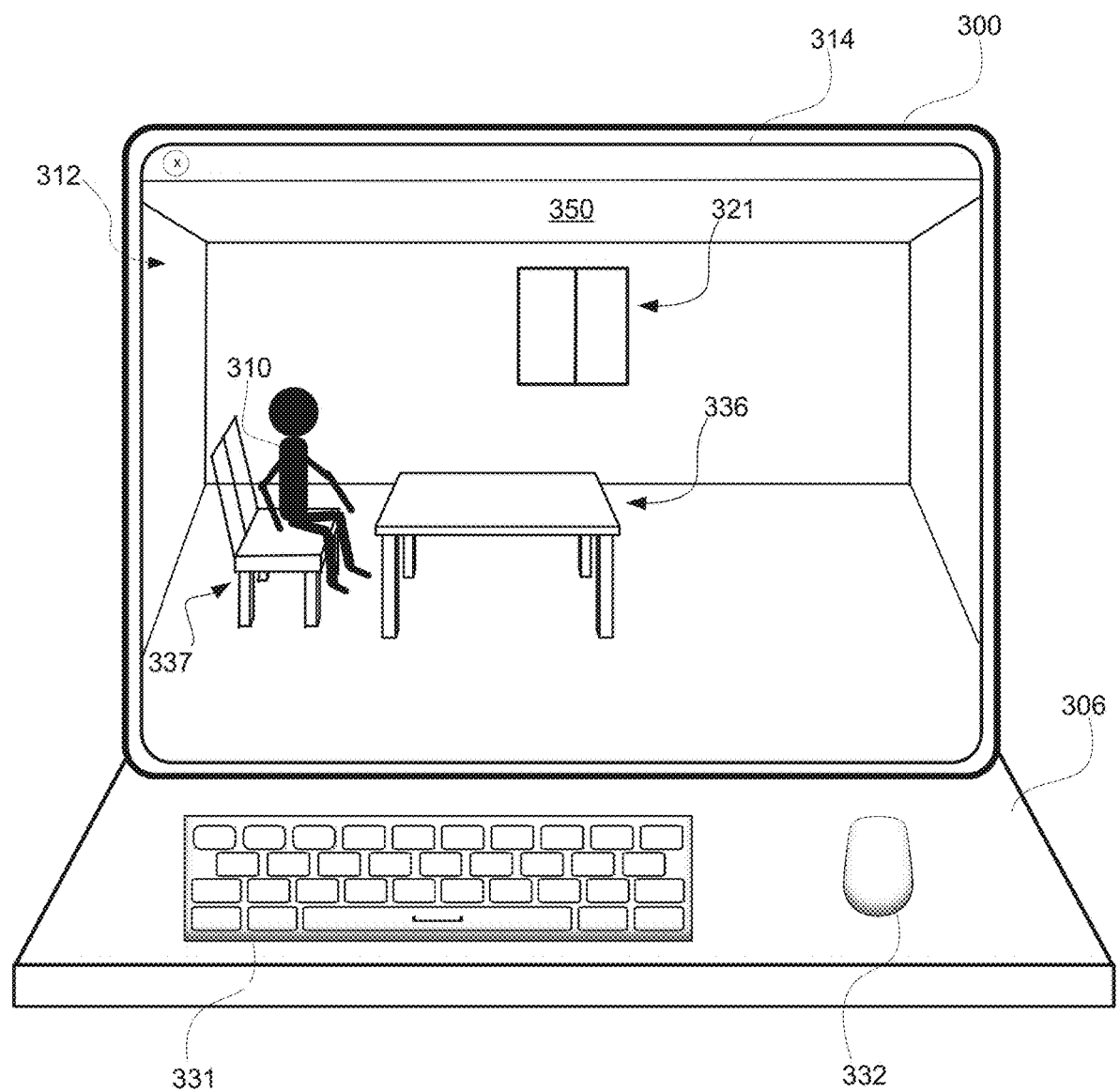

In some embodiments, as shown in FIG. 3I, in response to detecting the input 371H, the electronic device 300 causes the simulator application to position the virtual agent 310 on the chair 337 in the computer-generated environment 350. For example, as shown in FIG. 3I, the virtual agent 310 is sitting on the chair 337 and is oriented to face toward the table 336 in the computer-generated environment 350. Accordingly, as shown in FIG. 3I, because the virtual agent 310 interacted with the chair 337 in the computer-generated environment 350 as directed by the input 371H detected via the mouse 332, the interaction of the virtual agent 310 with respect to the chair 337 performed as expected (e.g., as desired). Thus, when the virtual agent 310 (or similar virtual object) is displayed in a three-dimensional computer-generated environment using a respective electronic device that is different from the electronic device 300 (e.g., in a virtual video game scenario), if the respective electronic device detects an input corresponding to a request to cause the virtual agent 310 to perform a particular interaction with an object, as similarly discussed above, the virtual agent 310 would perform the interaction with the object in the three-dimensional computer-generated environment in response to the input as similarly shown in FIG. 3I.

In some embodiments, as similarly discussed above, when the electronic device 300 receives the input 371H via the mouse 332 in FIG. 3H, the electronic device 300 optionally converts first input data corresponding to the input 371H to second input data that is interpreted by the guest operating system of the simulation application as input provided by a respective user (e.g., via a controller) for directing the virtual agent 310 to interact with the chair 337. In some embodiments, when the guest operating system receives the second input data, as similarly discussed above, the secondary application updates the application data associated with the virtual agent 310. For example, the application data is updated to cause the virtual agent 310 to perform an interaction with respect to the chair 337 (e.g., sit in the chair 337). In some embodiments, the secondary application transmits, to the guest operating system, the updated application data, and, in response, the guest operating system transmits synthetic output data that includes instructions for causing the electronic device 300 to update display of the virtual agent 310 via the display 314 and position the virtual agent 310 on the chair 337 in the computer-generated environment as similarly shown in FIG. 3I.

In some embodiments, the simulation application may also enable the user of the electronic device 300 to test predetermined interactions between the virtual agent 310 and other objects that are not necessarily directed by user input. For example, when the virtual agent 310 (or similar virtual object) is displayed in a three-dimensional computer-generated environment using a respective electronic device that is different from the electronic device 300 (e.g., in a virtual video game scenario), the virtual agent 310 may be configured to interact with objects based on one or more characteristics of the objects. In some embodiments, when the simulator application is simulating interactions of the virtual agent 310 with its surroundings, the guest operating system detects contextual information of the chair 337, such as the type of object (e.g., real-world or virtual), surface texture (e.g., flat, uneven, etc.), size, location, and/or motion (e.g., whether the object is moving), in the computer-generated environment 350. For example, the input 371H may not necessarily correspond to a command for the virtual agent 310 to sit on the chair 337 but may instead correspond to a command for the virtual agent 310 to interact with the chair 337 more generally. In some embodiments, using the contextual information provided by the guest operating system of the simulation application, the secondary application with which the virtual agent 310 is associated determines the particular interaction the virtual agent 310 should perform. For example, because the virtual agent 310 has been directed to interact with the chair 337, one such interaction includes sitting on the chair 337. It should be understood that, in some embodiments, other interactions with the chair 337 are possible, such as pushing the chair 337 toward the table 336 or moving the chair 337 to a different location in the room of the computer-generated environment 350. Thus, when the virtual agent 310 (or similar virtual object) is displayed in a three-dimensional computer-generated environment using a respective electronic device that is different from the electronic device 300 (e.g., in a virtual video game scenario), if the respective electronic device detects an input corresponding to a request to cause the virtual agent 310 to interact with an object based on one or more characteristics of the object, as similarly discussed above, the virtual agent 310 would interact with the object in the three-dimensional computer-generated environment based on the one or more characteristics as shown in FIG. 3I.

Figure 3J:
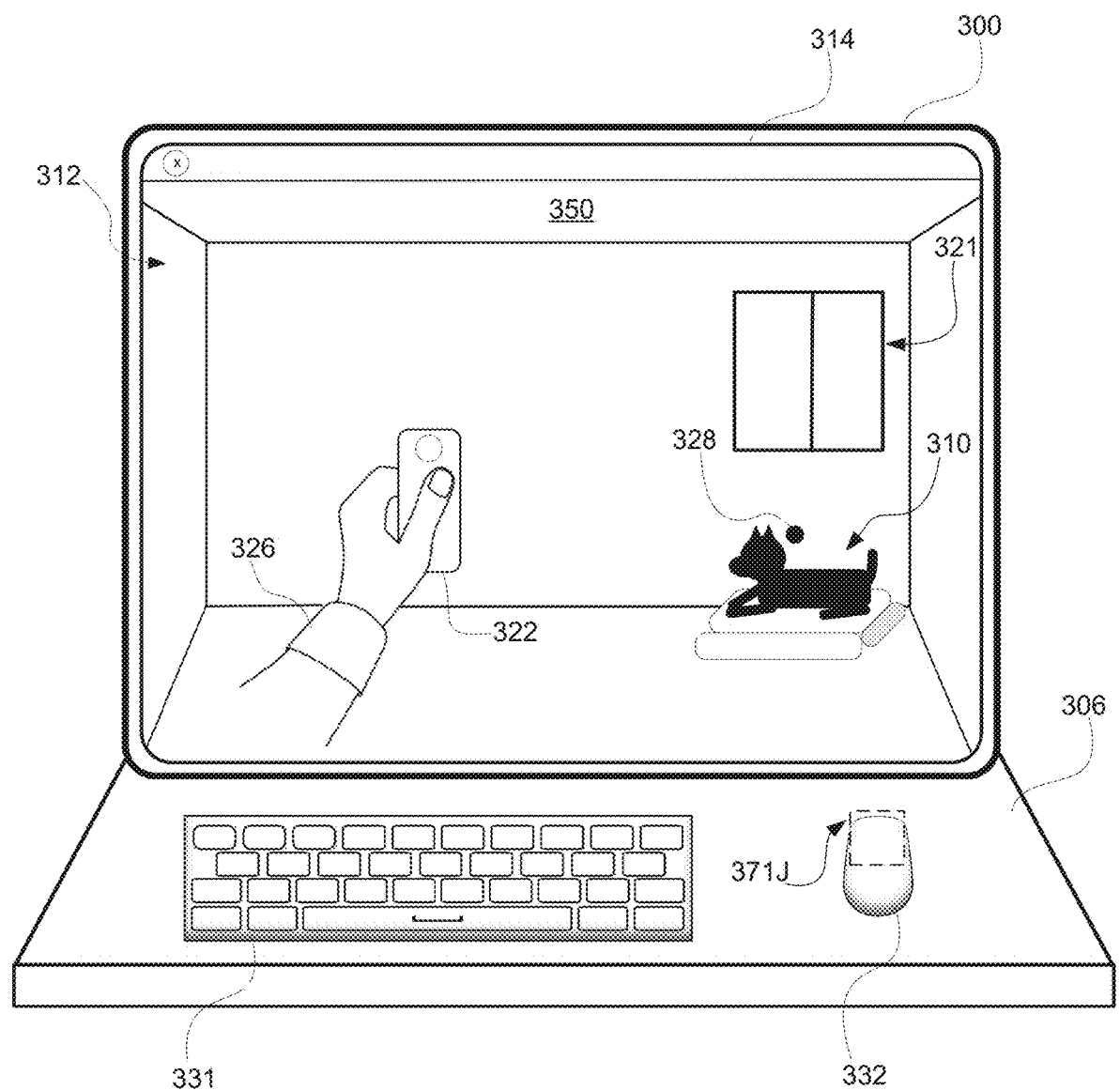

Additionally or alternatively, in some embodiments, the simulation application may provide a testing environment for evaluating a virtual experience that includes interactions between a respective user and a virtual agent. For example, with reference to FIG. 3J, the computer-generated environment 350 may alternatively include virtual agent 310, which optionally corresponds to a virtual pet (e.g., an animated dog). In some embodiments, as similarly discussed herein, the virtual agent 310 may be associated with a secondary application operating with the simulator application on the electronic device 300. In the example of FIG. 3J, the virtual agent 310 may not be directly controllable via user input received on the one or more input devices in communication with the electronic device 300. Rather, in some embodiments, as similarly discussed above, one or more interactions of the virtual hand 326 (including the virtual controller 322) may be driven via user input received on the one or more input devices in communication with the electronic device 300, such as the keyboard 331 and/or the mouse 332. In some embodiments, the simulation application may provide a testing environment for evaluating responsiveness of the virtual agent 310 to input provided (e.g., indirectly) by a respective user within a three-dimensional computer-generated environment by simulating interactions between the hand 326 and the virtual agent 310 within the computer-generated environment 350, as discussed below.

In FIG. 3J, the electronic device 300 optionally detects user input for causing the hand 326 of the respective user to provide input directed to the virtual agent 310 in the computer-generated environment 350. For example, as shown in FIG. 3J, the electronic device 300 detects input 371J via the mouse 332 (e.g., a press or click of the mouse 332). In some embodiments, the electronic device 300 alternatively detects one or more presses on one or more keys of the keyboard 331 corresponding to a request to cause the hand 326 to provide input directed to the virtual agent 310 in the computer-generated environment 350. In some embodiments, the input 371J corresponds to input provided by the hand 326 for causing the virtual agent 310 to perform a particular action in the computer-generated environment 350. For example, if the virtual agent 310 were displayed in a three-dimensional computer-generated environment presented at a respective electronic device that is different from the electronic device 300, the input 371J simulates an input provided by the hand 326 of a respective user that is optionally detected via the controller 322 (or some other input device) while a gaze of the respective user (e.g., represented by circle 328) is directed to the virtual agent 310.

Figure 3K:
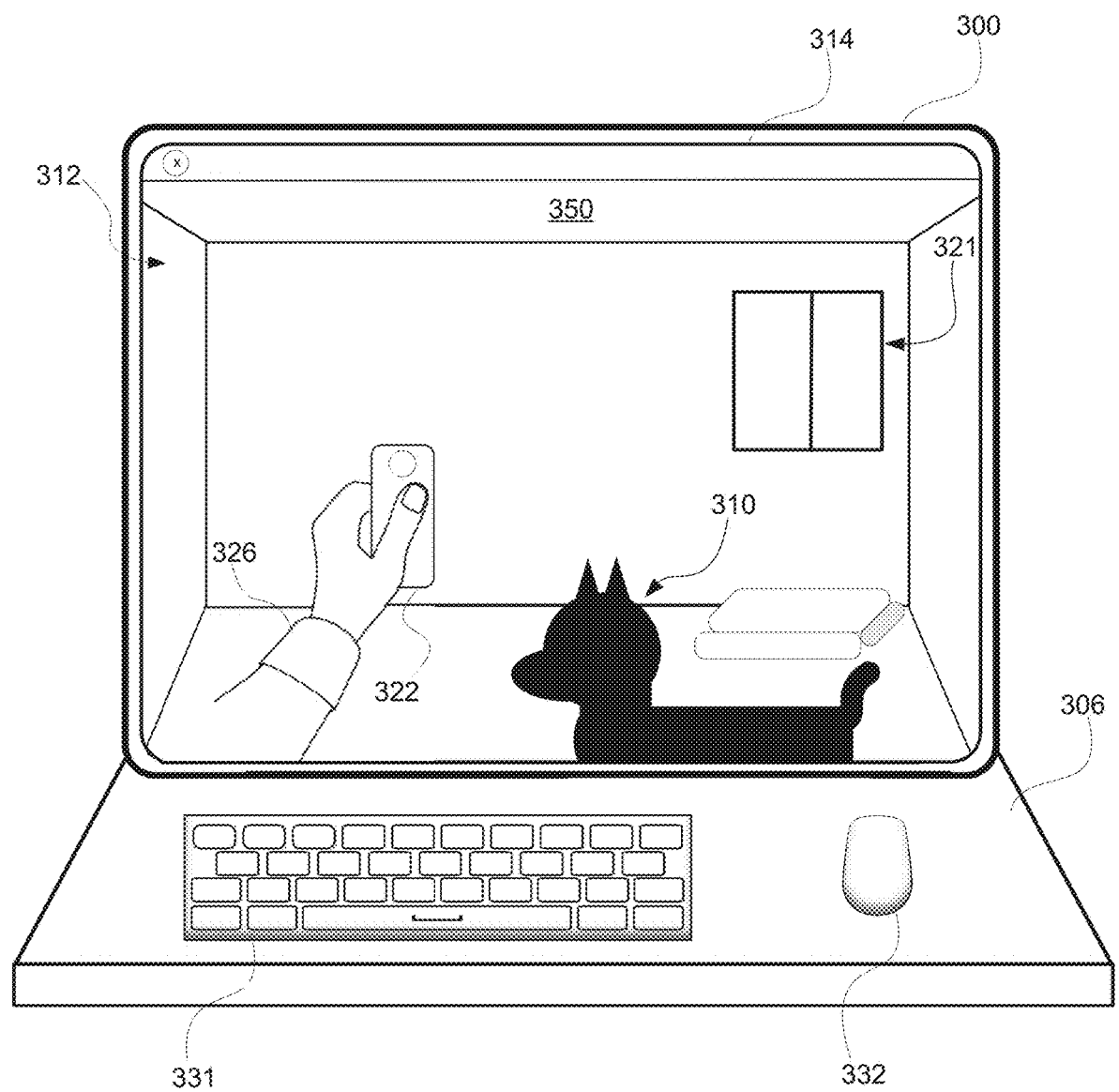

In some embodiments, as shown in FIG. 3K, in response to receiving the input 371J, the electronic device 300 updates, via the display 314, display of the simulation user interface 312. For example, as shown in FIG. 3K, the electronic device 300 causes the virtual agent 310 to perform an action, such as moving closer to the respective user (e.g., to whom the hand 326 belongs) in the computer-generated environment 350 based on the input 371J received via the mouse 332 (e.g., which corresponds to the input provided by the hand 326 of the respective user). As shown in FIG. 3K, because the virtual agent 310 moved toward the respective user (e.g., such as toward the hand 326) in the computer-generated environment 350 as directed by the input 371J detected via the mouse 332, the responsiveness of the virtual agent 310 to input provided by the respective user can be evaluated. For example, when the virtual agent 310 (or similar virtual object) is displayed in a three-dimensional computer-generated environment using a respective electronic device that is different from the electronic device 300, if the respective electronic device detects input similar to the input provided by the hand 326 (e.g., via the controller 322), such as an input corresponding to a calling command directed to the virtual agent 310 (e.g., the virtual dog), the virtual agent 310 would move toward a location of the respective user in the three-dimensional computer-generated environment as similarly shown in FIG. 3K. It should be understood that, in some embodiments, the simulation application enables the user of the electronic device 300 to evaluate other interactions with the virtual agent 310, such as "playing fetch" with the virtual agent 310, commanding the virtual agent 310 to "sit" or "shake," among other possibilities.

Accordingly, as discussed above, providing the simulation application that includes a guest operating system configurable to communicate with a host operating system of the electronic device on which the simulation application runs enables a user of the electronic device to test and later modify three-dimensional virtual experiences in two dimensions. Additionally, as one advantage, because the simulation application may be provided on an electronic device that includes a two-dimensional display, virtual experiences may be evaluated without requiring a user to use a separate electronic device (or a separate display) from the electronic device on which the virtual experiences are created and modified, thereby improving user workflow for testing and subsequently modifying the virtual experiences. Attention is now directed to example autonomous interactions of a virtual agent with its environment within the simulator application discussed above.

Figure 4A:
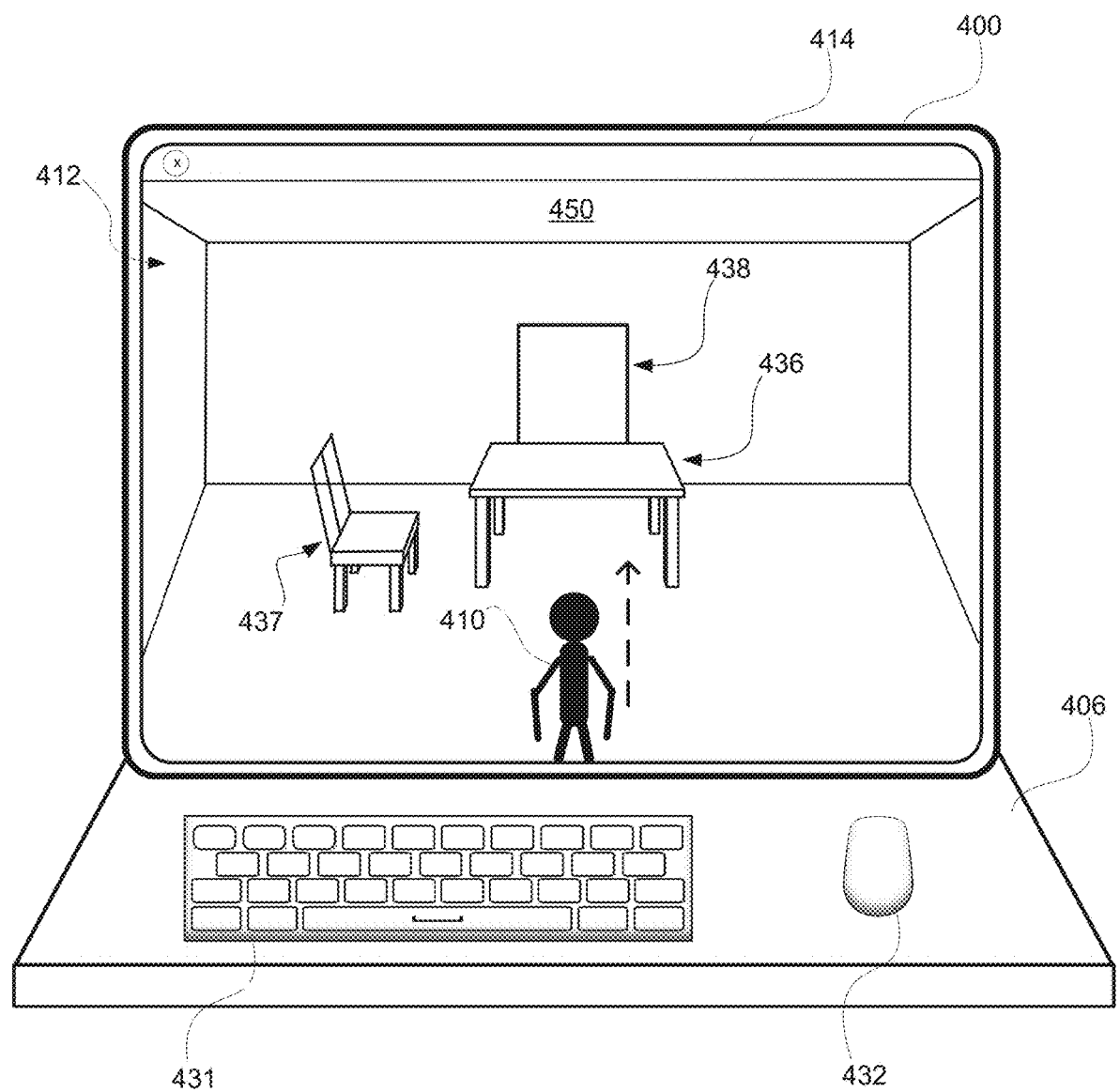
FIGS. 4A-4I illustrate exemplary autonomous interactions involving an object within a simulator application operating on an electronic device according to some embodiments of the disclosure.

FIGS. 4A-4I illustrate exemplary autonomous interactions involving an object within a simulator application operating on an electronic device according to some embodiments of the disclosure. In some embodiments, as shown in FIG. 4A, an electronic device 400 may present simulation user interface 412 associated with a simulator application operating on the electronic device 400. In some embodiments, the electronic device 400 optionally corresponds to electronic device 300 discussed above. Additionally, in some embodiments, the simulation user interface 412 and simulator application correspond to the simulation user interface 312 and the simulator application, respectively, described above. In some embodiments, as shown in FIG. 4A, the simulation user interface 412 includes computer-generated environment 450 (e.g., a room) including chair 437 and table 436. In some embodiments, the computer-generated environment 450 has one or more characteristics of the computer-generated environment 350 described above. In some embodiments, the electronic device 300 is in communication with one or more input devices, such as keyboard 431 and mouse 432. In some embodiments, the one or more input devices correspond to the one or more input devices (e.g., keyboard 331 and mouse 332) described above.

As similarly discussed above, in some embodiments, the simulator application, via the simulation user interface 412, may enable a user of the electronic device 400 to simulate and subsequently evaluate three-dimensional virtual experiences in two dimensions. As described above with reference to FIGS. 3A-3K, behaviors of virtual objects and/or agents in a virtual experience can be evaluated based the interactions of the virtual objects and/or agents within a two-dimensional computer-generated environment produced by input received via the one or more input devices in communication with the electronic device (e.g., the electronic device 300). In some embodiments, one or more autonomous interactions involving virtual objects and/or agents may be evaluated using the simulator application. For example, as discussed below, a virtual agent may move autonomously (e.g., independent of user input) within the computer-generated environment 450 of the simulation user interface 412 to evaluate the interactions of the virtual agent with other objects in the computer-generated environment 450, and thus, when the virtual agent is presented in a three-dimensional computer-generated environment, the interactions of the virtual agent with objects (e.g., real-world or other virtual objects) in the three-dimensional computer-generated environment.

As shown in FIG. 4A, in some embodiments, the computer-generated environment 450 may include virtual agent 410, which optionally corresponds to a virtual character (e.g., an animated character). In some embodiments, the virtual agent 410 has one or more characteristics of the virtual agent 310 discussed above. In some embodiments, the virtual agent 410 is configured to move autonomously within the computer-generated environment 450. For example, when the virtual agent 410 is displayed in the computer-generated environment 450, the virtual agent 410 may perform one or more actions (e.g., interact with other objects) independent of user input (e.g., without requiring the user of the electronic device 400 to provide input on the keyboard 431 or the mouse 432). In some embodiments, as similarly discussed above, the virtual agent 410 may be associated with a secondary application that provides application data to a guest operating system of the simulator application for rendering the virtual agent 410 in the computer-generated environment 450 (e.g., when the application data is transmitted (e.g., via synthetic output data) to the host operating system for display of the virtual agent 410 on display 414).

In some embodiments, as discussed in more detail later, the virtual agent 410 initiates autonomous movement within the computer-generated environment 450 when the host operating system of the electronic device 400 receives first data (e.g., synthetic output data) from the guest operating system of the simulator application. For example, the first data is generated based on the application data received from the secondary application with which the virtual agent 410 is associated. In some embodiments, the application data includes commands, instructions, goals, etc. that control the autonomous interactions of the virtual agent 410 with respect to the computer-generated environment 450 in the simulation user interface 412.

In some embodiments, in FIG. 4A, the guest operating system of the simulation application receives application data from the secondary application with which the virtual agent 410 is associated for causing movement of the virtual agent 410. For example, as shown in FIG. 4A, the application data defines a goal for interaction by the virtual agent 410. In some embodiments, the goal of the virtual agent 410 includes identifying and passing through an exit way in the computer-generated environment 450. As shown in FIG. 4A, the computer-generated environment 450 includes doorway 438 that is spatially located behind the table 436 relative to the virtual agent 410. As mentioned above, the guest operating system receives the application data without receiving input data from the host operating system of the electronic device 400 (e.g., input data associated with user input provided via the keyboard 431 or the mouse 432).

Figure 4B:
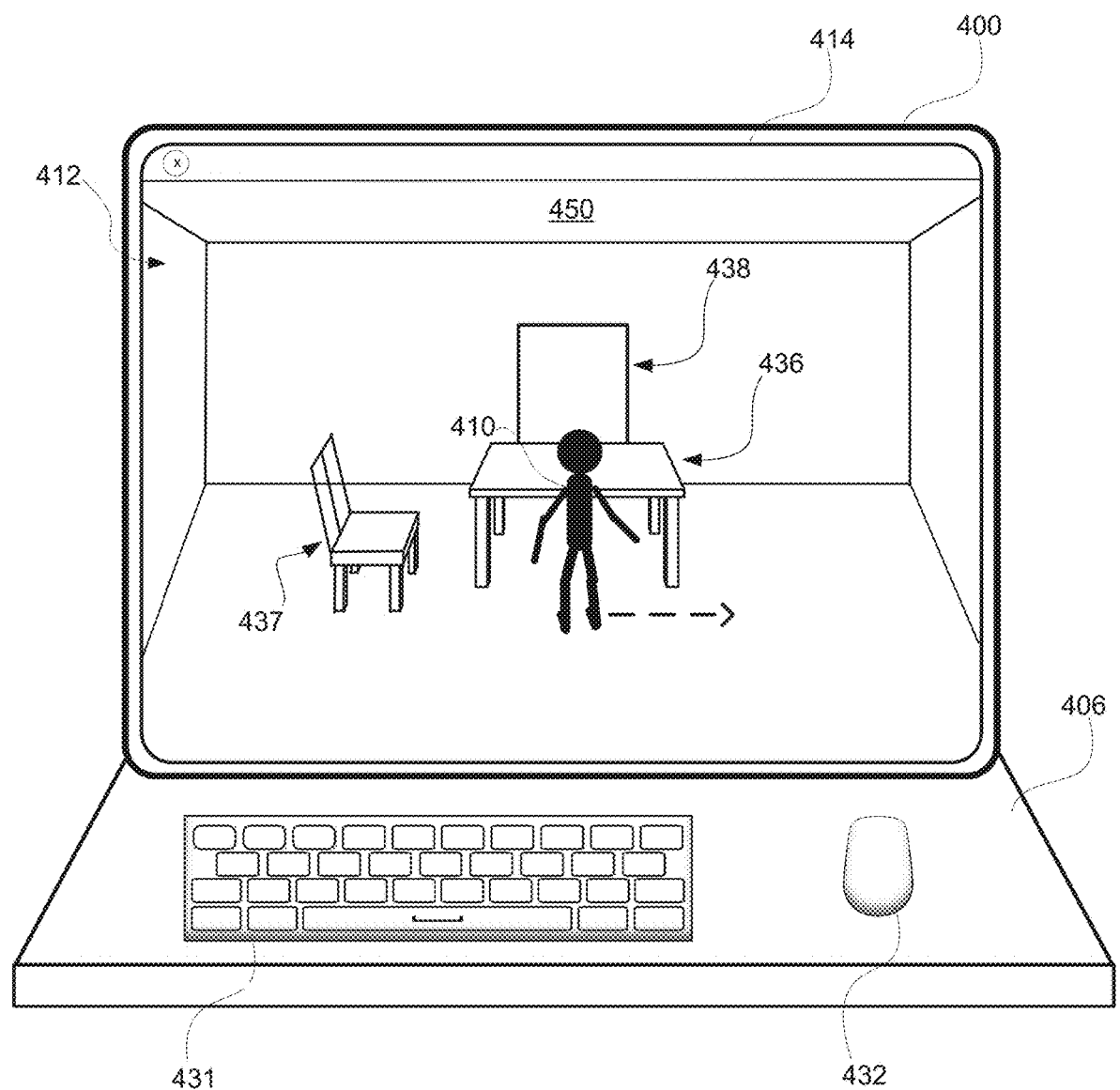

In some embodiments, as shown from FIGS. 4A-4B, in response to receiving the first data from the guest operating system of the simulation application, the electronic device 300 updates display of the virtual agent 410 in the computer-generated environment 450. For example, as shown in FIG. 4B, the electronic device 400 initiates movement of the virtual agent 410 toward the doorway 438 in the computer-generated environment 450. In some embodiments, movement of the virtual agent 410 toward the doorway 438 includes changing a path of motion based on one or more characteristics of the computer-generated environment 450. For example, as mentioned above, the table 436 is located spatially between the virtual agent 410 and the doorway 438, as shown in FIGS. 4A-4B. In some embodiments, while walking toward the doorway 438 (e.g., forward in a straight line), as shown in FIG. 4B, the virtual agent 410 stops walking, and begins moving in a new direction of motion. For example, as shown in FIG. 4B, the chair 437 is located to the left of the virtual agent 410, making movement of the virtual agent 410 rightward around the table 436 more desirable for reaching the doorway 438.

In some embodiments, the secondary application with which the virtual agent 410 is associated determines a path of motion for the virtual agent 410 based on the one or more characteristics of the computer-generated environment 450. For example, as similarly discussed above with reference to FIGS. 3A-3K, the host operating system of the electronic device 400 transmits scene data corresponding to the computer-generated environment 450 to the guest operating system of the simulation application. In some embodiments, the scene data includes information corresponding to the chair 437 and the table 436, such as positions of the chair 437 and the table 436 relative to the virtual agent 410 and the doorway 438 to which the virtual agent 410 is configured to travel. In some embodiments, the guest operating system transmits synthetic scene data corresponding to the computer-generated environment 450 to the secondary application, which includes positional information for the chair 437, the table 436, and the doorway 438. Using the synthetic scene data, the secondary application optionally determines the path of motion for the virtual agent 410 and transmits the application data including the path of motion to the guest operating system of the simulation application. Finally, as shown in FIG. 4B, the guest operating system transmits synthetic output data that is based on the updated application data to the host operating system for updating display of the virtual agent 410 in the computer-generated environment 450, including the motion of the virtual agent 410 toward the doorway 438.

Figure 4C:
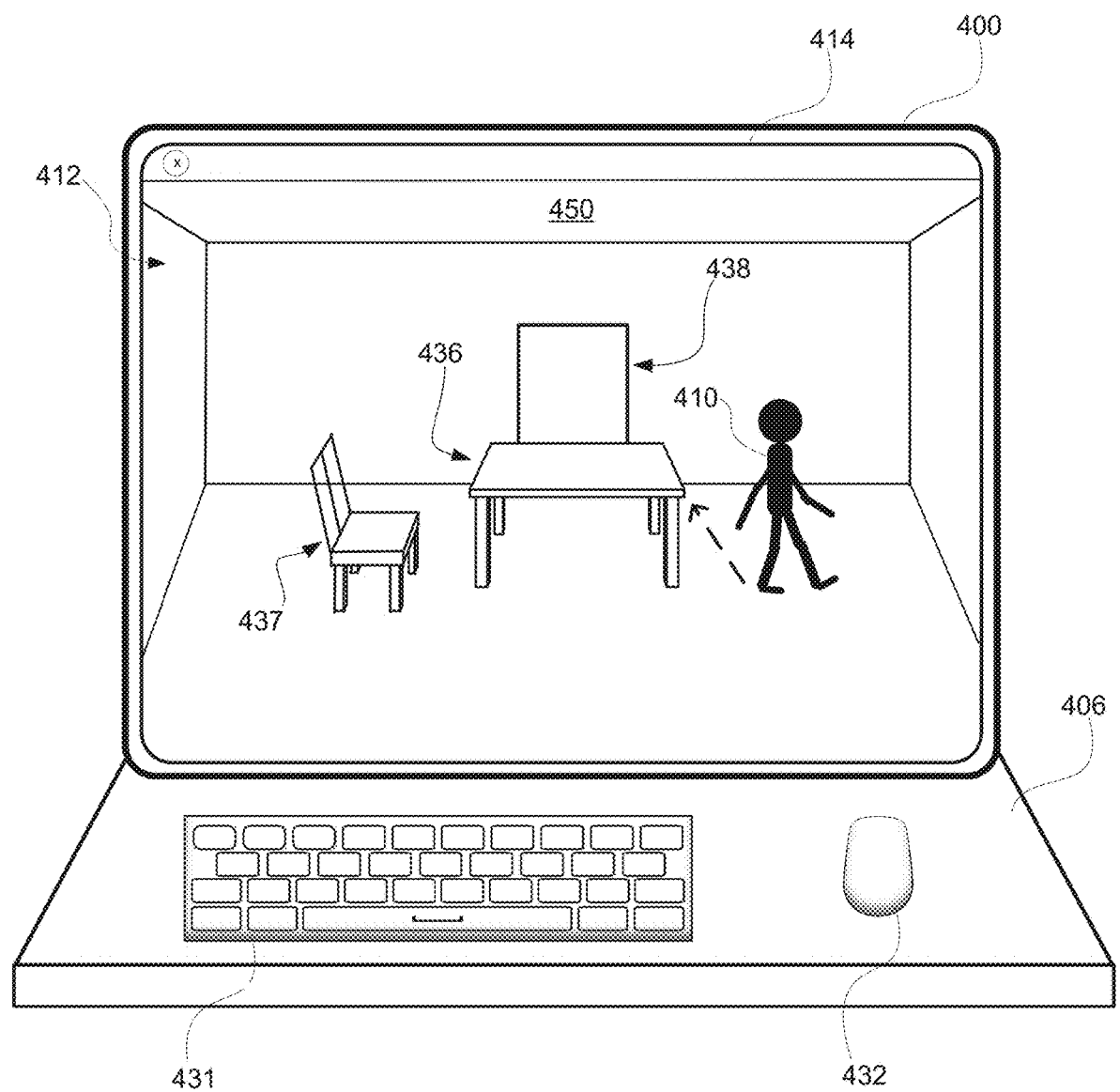

In some embodiments, as shown in FIG. 4C, after the virtual agent 410 reaches the table 436 in FIG. 4B, the virtual agent 410 moves (e.g., walks) rightward in the computer-generated environment 450, so as to avoid contact (e.g., collision) with the table 436. For example, the virtual agent 410 moves around the table 436 toward the doorway 438 in the computer-generated environment 450 in accordance with the motion path discussed above. In some embodiments, as shown in FIG. 4C, the virtual agent 410 continues moving (e.g., walking) toward the doorway 438. For example, the virtual agent 410 begins walking forward around the table 436 and toward the doorway 438.

Figure 4D:
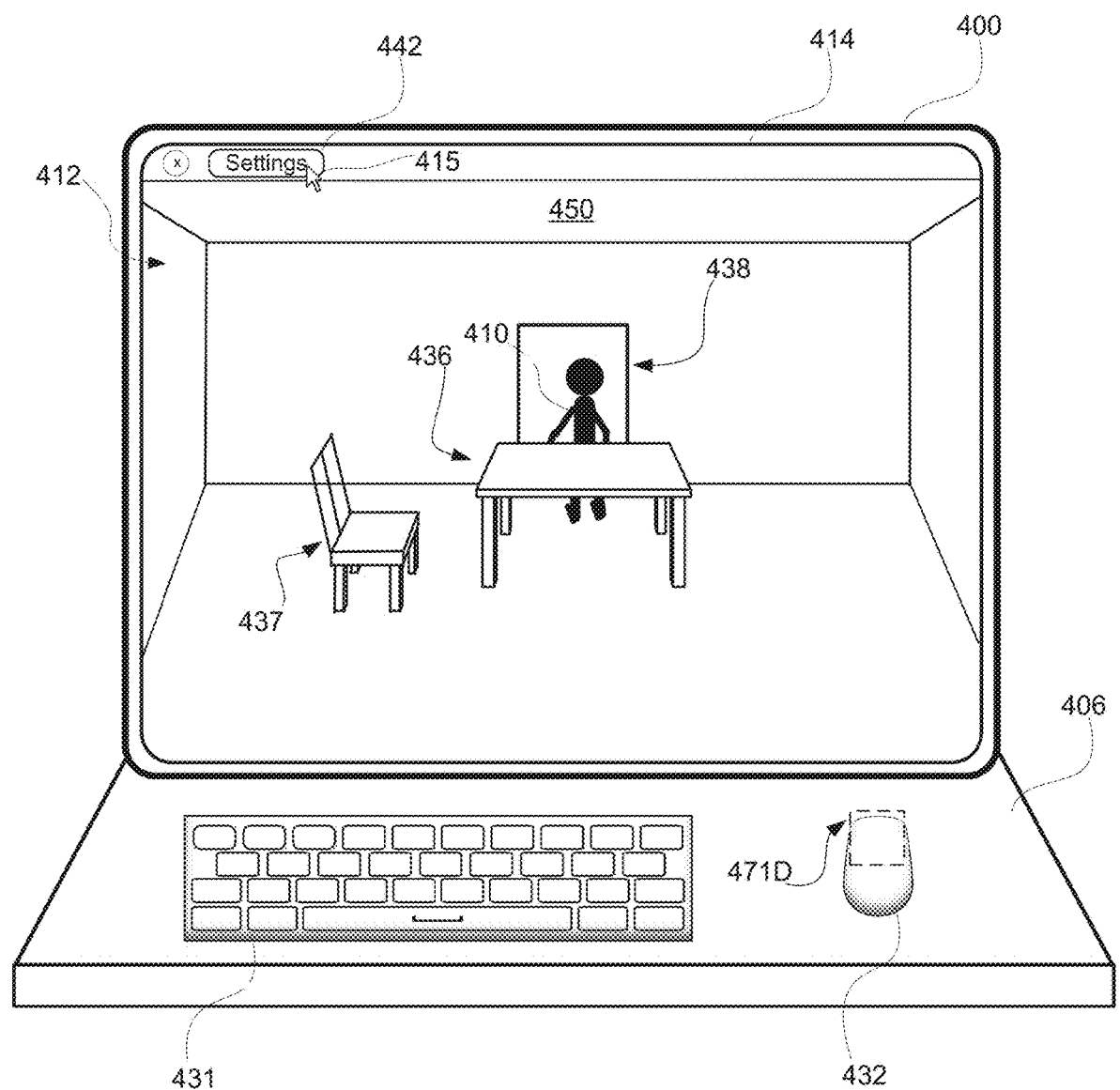

In FIG. 4D, the virtual agent 410 has walked around the table 436 and has reached the doorway 438. As shown in FIGS. 4A-4D, the virtual agent 410 moved autonomously in the computer-generated environment 450 in the simulation user interface 412 as directed by the first data received from the guest operating system of the simulation application. Additionally, the virtual agent 410 reached the exit way (e.g., the doorway 438) without contacting and/or being hindered by other objects in the computer-generated environment 450, such as the chair 437 and the table 436. Accordingly, as shown in FIG. 4D, because the virtual agent 410 reached with the doorway 438 in the computer-generated environment 450 as directed by the first data transmitted from the guest operating system, the autonomous movement of the virtual agent 410 with respect to the computer-generated environment performed as expected (e.g., as desired). Thus, when the virtual agent 410 (or similar virtual object) is displayed in a three-dimensional computer-generated environment using a respective electronic device that is different from the electronic device 400 (e.g., in a virtual video game scenario as a background character), the virtual agent 410 would perform one or more predetermined actions autonomously (e.g., independent of user input) in the three-dimensional computer-generated environment as similarly shown in FIGS. 4A-4D. Therefore, as discussed herein, providing the simulation application enables the user (e.g., a content creator and/or designer) to receive feedback regarding the performance of the autonomous virtual agent 410 in a three-dimensional computer-generated environment via a two-dimensional platform, as one advantage.

In some embodiments, as previously mentioned herein, the computer-generated environment 450 may be user selectable. For example, it may be desirable to enable the user of the electronic device 400 to select alternate computer-generated environments for display in the simulation user interface 412 to evaluate behavior of a virtual object (e.g., a virtual agent) in the alternate computer-generated environments. As shown in FIG. 4D, in some embodiments, the simulation user interface 412 includes a settings option 442 that is selectable to display a settings user interface via which the user may designate an alternative computer-generated environment for display in the simulation user interface 412. As shown in FIG. 4D, the electronic device 400 optionally detects selection of the settings option 442 in the simulation user interface 412. For example, the electronic device 400 detects input 471D (e.g., a press or click) on the mouse 432 while the cursor 415 is positioned over the settings option 442.

Figure 4E:
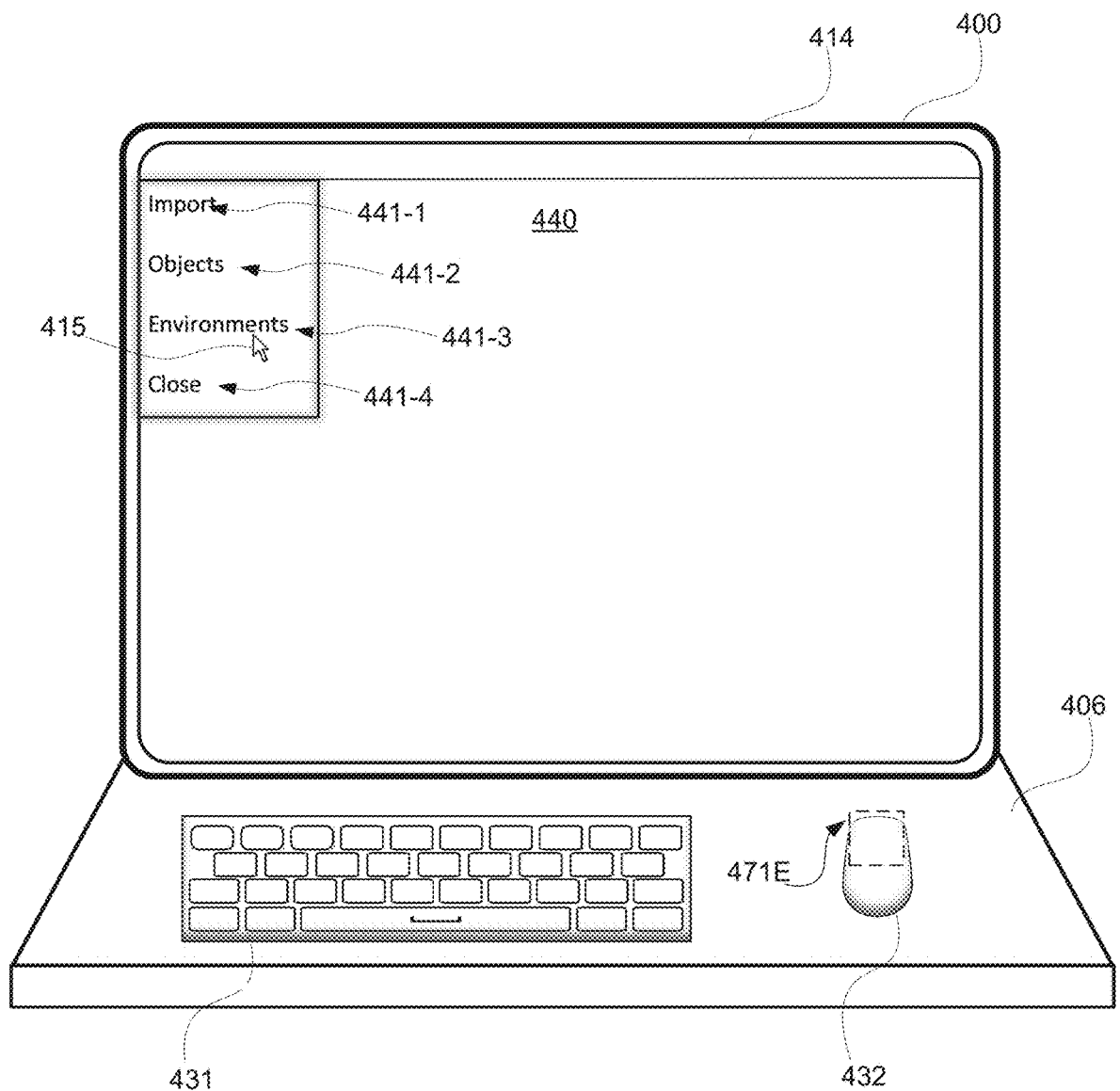

In some embodiments, as shown in FIG. 4E, in response to detecting the input 471D, the electronic device 400 displays settings user interface 440 on the display 414. For example, the electronic device 400 ceases display of the simulation user interface 412 described above. In some embodiments, as shown in FIG. 4E, the settings user interface 440 includes a plurality of options 441 for configuring one or more functionalities of the simulation application. For example, as shown in FIG. 4E, the settings user interface 440 includes an import option 441-1, an objects option 441-2, an environments option 441-3, and/or a close option 441-4. In some embodiments, the import option 441-1 is selectable to initiate a process for importing data (e.g., application data corresponding to virtual objects, such as the virtual agent 410) from one or more secondary applications, such as the secondary applications described above. In some embodiments, the objects option 441-2 is selectable to initiate a process to select particular objects for display in a respective computer-generated environment in the simulation user interface 412, such as the table 436 and the chair 437 discussed above. In some embodiments, the environments option 441-3 is selectable to initiate a process for selecting an alternative computer-generated environment for display in the simulation user interface 412. In some embodiments, the close option 441-4 is selectable to navigate away from the settings user interface 440 and redisplay the simulation user interface 412 in FIG. 4D.

Figure 4F:
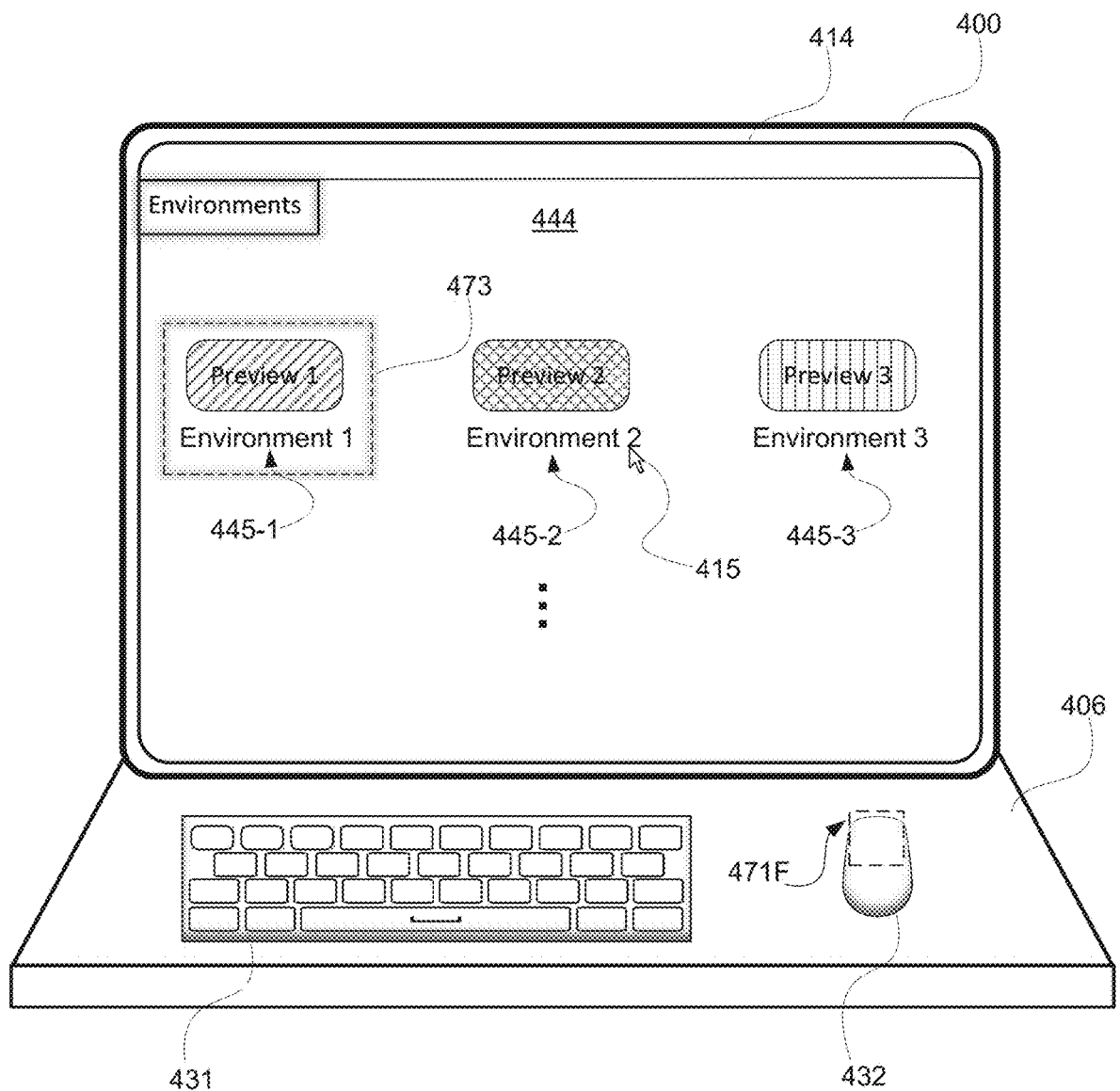

In FIG. 4E, the electronic device 400 optionally detects selection of the environments option 441-3 in the settings user interface 440. For example, as shown in FIG. 4E, the electronic device 400 detects input 471E (e.g., a press or click) on the mouse 432 while the cursor 415 is positioned over the environments option 441-3. In some embodiments, as shown in FIG. 4F, in response to detecting the input 471E, the electronic device 400 displays environments user interface 444 on the display 414. In some embodiments, as shown in FIG. 4F, the environments user interface 444 includes a library of environments that are selectable for display in the simulation user interface 412. For example, as shown in FIG. 4F, the electronic device 400 displays a first user interface object 445-1 associated with a first environment ("Environment 1"), a second user interface object 445-2 associated with a second environment ("Environment 2"), a third user interface object 445-3 associated with a third environment ("Environment 3"), and so on. In some embodiments, the user interface objects 445 may include a preview ("Preview 1," "Preview 2," etc.) of their respective environments. For example, the user interface objects 445 include a still image, a video clip, a color map, etc. corresponding to their respective environments. In the example of FIG. 4F, the computer-generated environment 450 of FIGS. 4A-4D optionally corresponds to the first environment associated with the first user interface object 445-1. Accordingly, the environments user interface 44 may include an indication that the first environment is currently selected, such as visual indication 473 (e.g., highlighting, ring, bolding, etc.) displayed with the first user interface object 445-1, as shown in FIG. 4F.

In some embodiments, the user of the electronic device 400 may designate an alternative environment for display in the simulation user interface 412 by selecting one of the user interface objects 445. In FIG. 4F, the electronic device 400 optionally detects designation of the second environment for display in the simulation user interface 412. For example, as shown in FIG. 4F, the electronic device detects input 471F (e.g., a press or click) on the mouse 432 while the cursor 415 is positioned over the second user interface object 445-2 that is associated with the second environment. In some embodiments, in response to detecting the input 471F, the electronic device 400 updates the simulation user interface 412 to include the second environment. For example, the host operating system of the electronic device 400 transmits scene data corresponding to the second environment (e.g., stored in memory of the electronic device 400, such as memory 120 in FIG. 1) to the guest operating system of the simulation application and renders computer-generated environment 452, as shown in FIG. 4G.

Figure 4G:
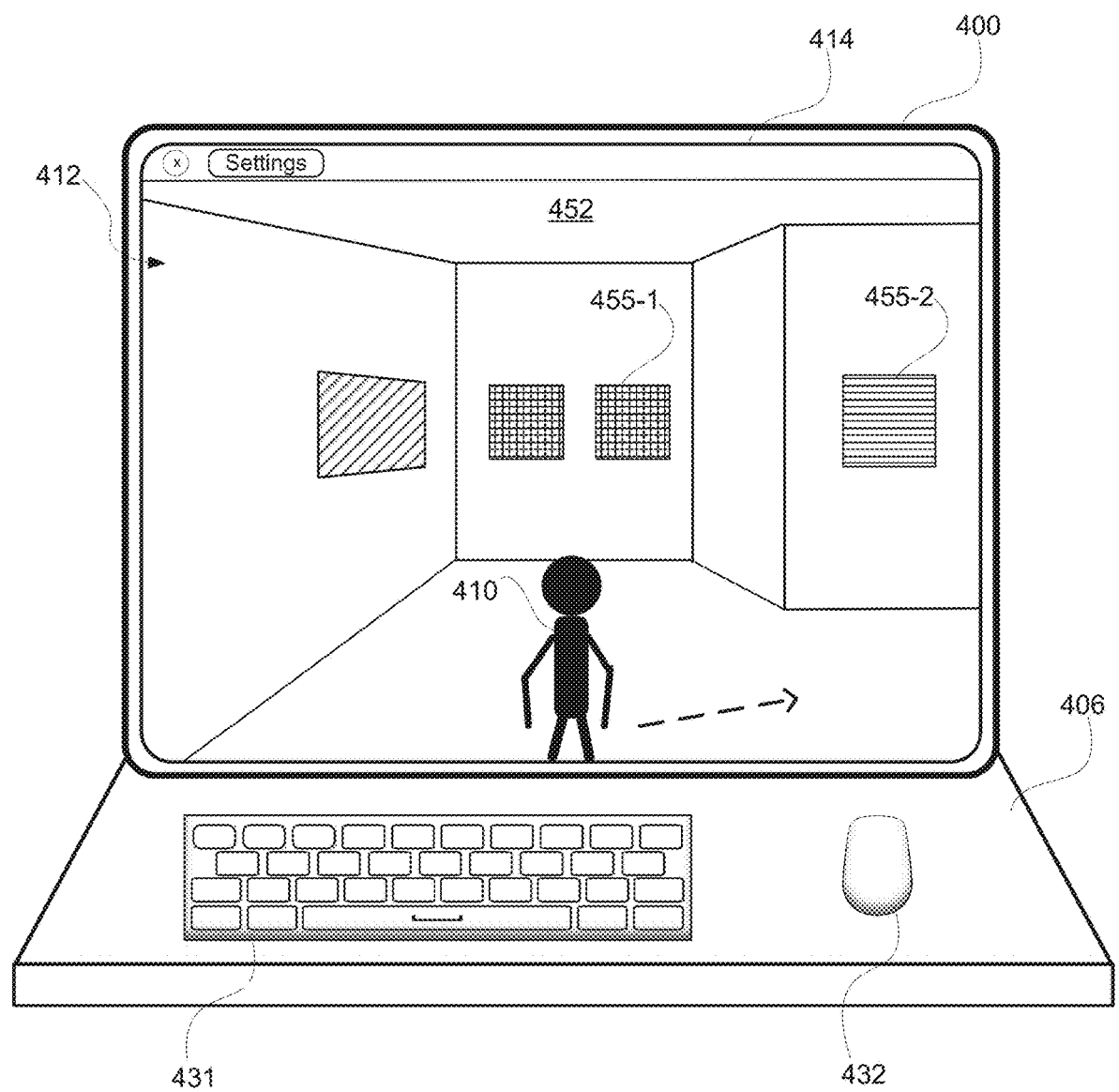

In some embodiments, as shown in FIG. 4G, when the simulation user interface 412 is redisplayed on the display 414, the simulation user interface 412 includes the second computer-generated environment 452, which is optionally different from the computer-generated environment 450 of FIGS. 4A-4D. For example, the second computer-generated environment 452 corresponds to an art gallery that includes a plurality of art pieces 455, such as first painting 455-1 and second painting 455-2. Additionally, as shown in FIG. 4G, the simulation user interface 412 once again includes the virtual agent 410, now positioned within the second computer-generated environment 452. As discussed above, the virtual agent 410 may be configured to move autonomously within the second computer-generated environment 452 according to the first data received from the guest operating system of the simulator application. For example, as previously discussed, the virtual agent 410 may be assigned the goal to locate and travel to an exit way in the second computer-generated environment. Providing the second computer-generated environment 452 thus enables the user of the electronic device 400 to evaluate the behavior of the virtual agent 410 within a different environment in the simulator application, as discussed below.

As shown in FIG. 4G, an exit way is currently not present in the portion of the second computer-generated environment 452 that is displayed in the simulation user interface 412. Accordingly, the path of motion of the virtual agent 410 in the second computer-generated environment 452 includes movement of the virtual agent 410 to portions of the second computer-generated environment 452 that are not currently displayed in the simulation user interface 412. For example, in FIG. 4G, the virtual agent 410 begins moving forward and rightward (e.g., diagonally) in the second computer-generated environment 452. As similarly discussed above, the path of motion of the virtual agent 410 is determined by the secondary application with which the virtual agent 410 is associated, and such determination is transmitted to the host operating system of the electronic device 400 by the guest operating system of the simulator application via first data.

Figure 4H:
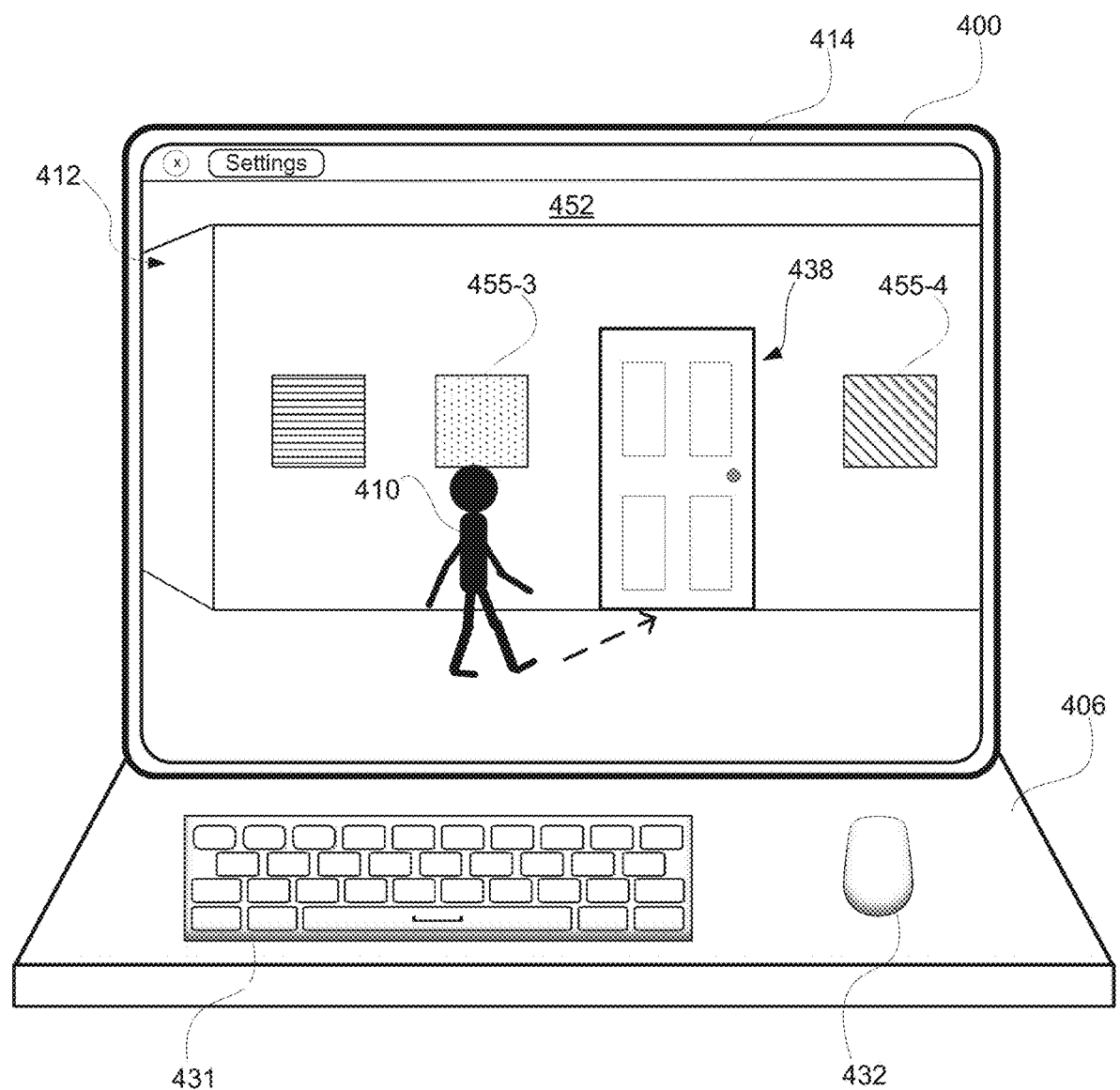

In some embodiments, as shown in FIG. 4H, the virtual agent 410 moves within the second computer-generated environment 452 in accordance with the determined path of motion included in the first data. Additionally as shown in FIG. 4H, when the virtual agent 410 moves (e.g., walks) within the second computer-generated environment 452, the electronic device 400 displays additional portions of the second computer-generated environment 452 based on the movement of the virtual agent 410. For example, the electronic device 400 displays portions of the second computer-generated environment 452 that are rightward of the portion of the second computer-generated environment 452 shown in FIG. 4G. As shown in FIG. 4H, the additional portions of the second computer-generated environment 452 include additional art pieces, such as third painting 455-3 and fourth painting 455-4, as well as doorway 438.

Figure 4I:
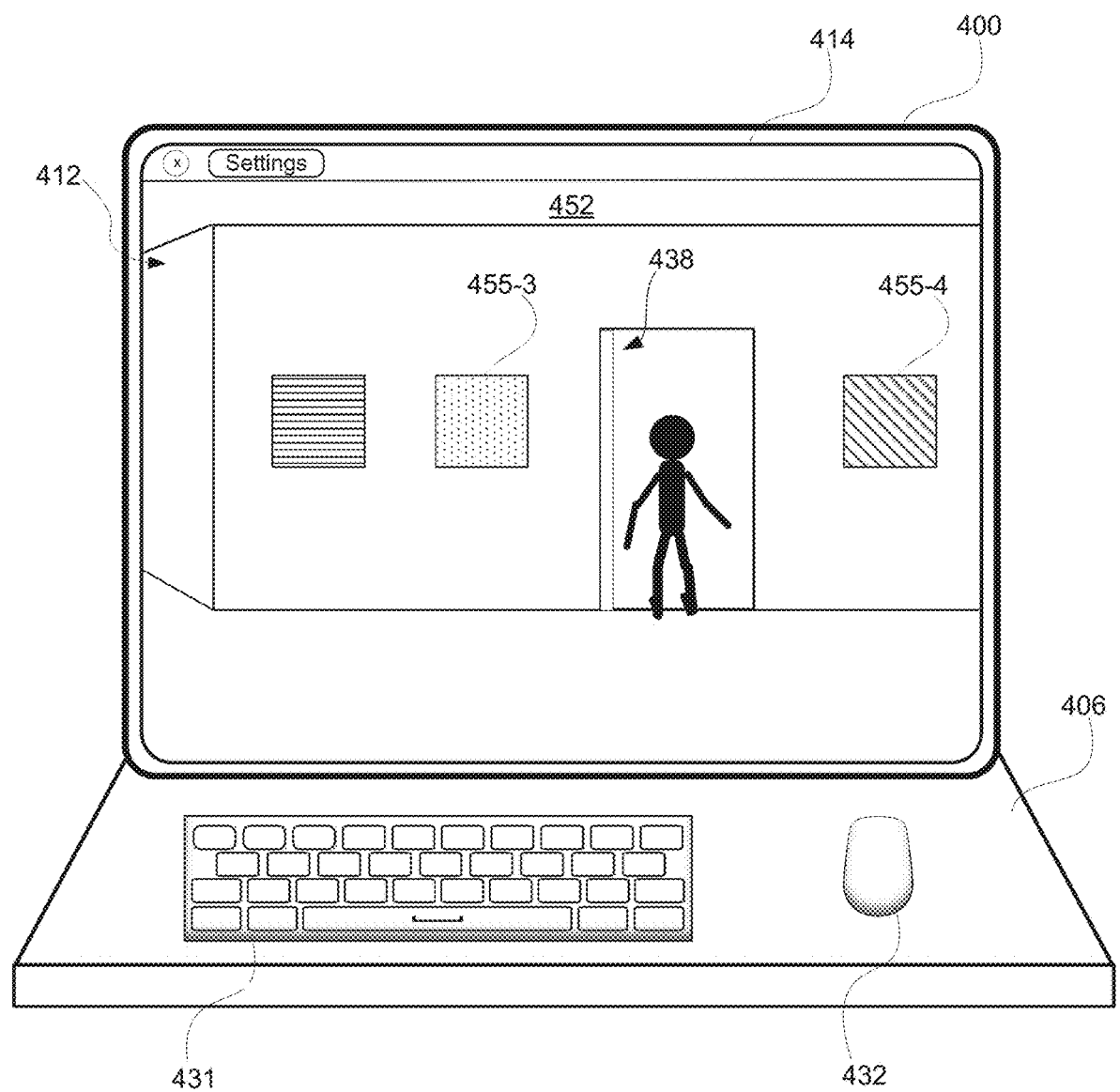

In some embodiments, the motion path of the virtual agent 410 is determined based on the additional portions of the second computer-generated environment 452. For example, as mentioned above, the goal for the virtual agent 410 in the second computer-generated environment 452 is to identify and travel to an exit way. In FIG. 4H, because the doorway 438 is now displayed in the portion of the second computer-generated environment 452 included in the simulation user interface 412, the motion path of the virtual agent 410 includes movement toward the doorway 438. In some embodiments, as shown in FIG. 4I, the electronic device 400 moves the virtual agent 410 forward in the second computer-generated environment 452 toward the doorway 438. In some embodiments, traveling to the exit way at the doorway 438 includes opening the doorway 438, as shown in FIG. 4I. Accordingly, as discussed with reference to FIGS. 4G-4I, the virtual agent 410 was able to perform the same operation (e.g., locate an exit way) in a different environment (e.g., the second computer-generated environment 452) autonomously as directed by the application data provided by the secondary application, indicating that, in a three-dimensional computer-generated environment, the virtual agent 410 would successfully perform a particular predetermined action without direct input by a user.

It is understood that the embodiments shown and described herein are merely exemplary and that additional and/or alternative elements may be provided within the computer-generated environments above for evaluating interactions with and/or among virtual objects (e.g., virtual agents, representations of physical objects, etc.). It should be understood that the appearance, shape, form, and size of each of the various user interface elements and objects shown and described herein are exemplary and that alternative appearances, shapes, forms and/or sizes may be provided. For example, the virtual objects representative of application windows (e.g., application window 325) may be provided in an alternative shape than a rectangular shape, such as a circular shape, triangular shape, etc., and the virtual agents (e.g., virtual agent 310/410) may be provided in other forms and/or appearances. Additionally, it should be understood that, in some embodiments, additional and/or alternative interactions may be evaluated using the simulation application discussed above, such as evaluating responsiveness to other user inputs, such as entering text into a virtual text-entry field, scrolling content in a virtual user interface, adding virtual objects to other virtual objects, etc.

Figure 5:
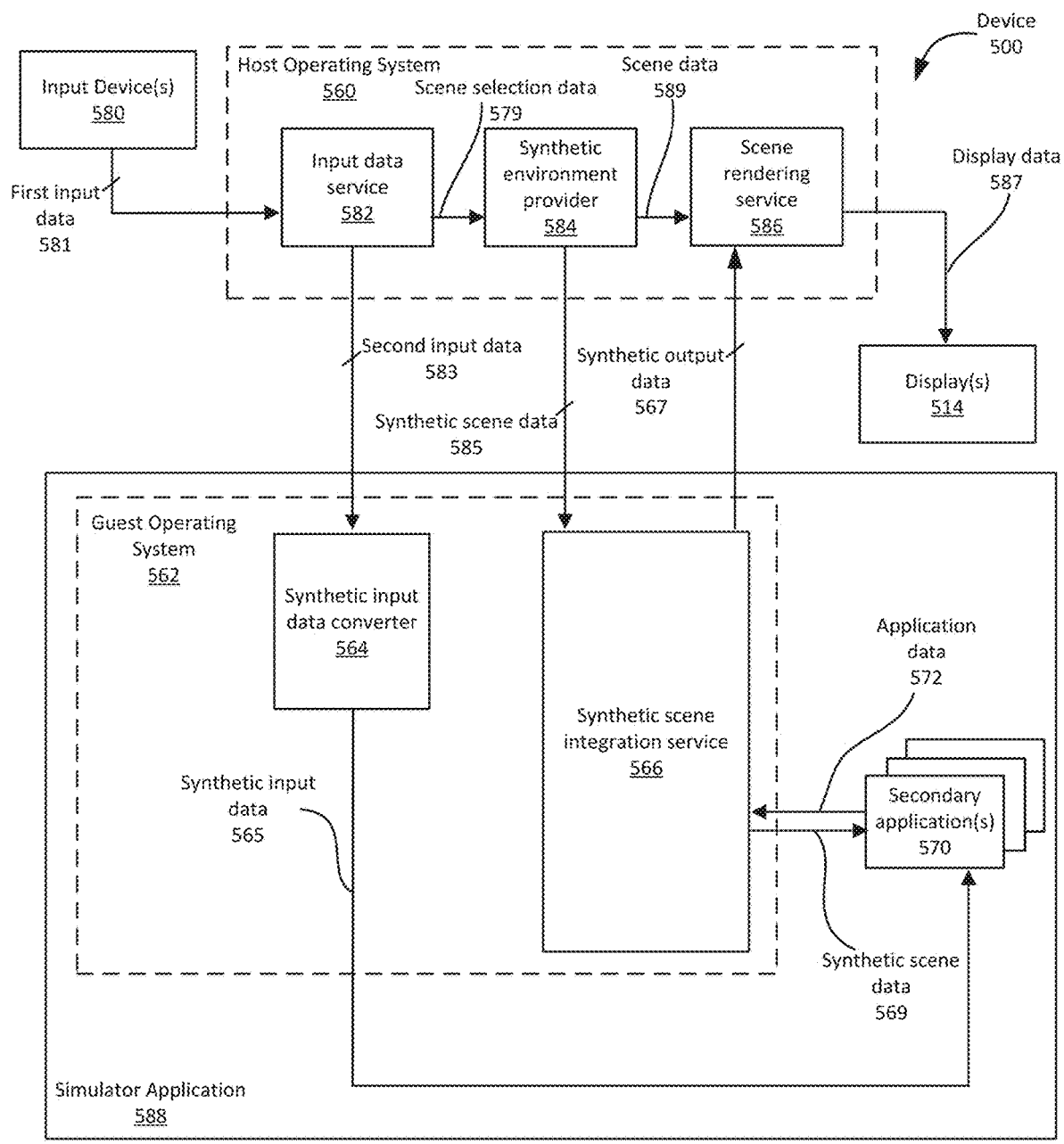
FIG. 5 is a block diagram illustrating exemplary communication between a host operating system of an electronic device and a guest operating system of a simulator application operating on the electronic device according to some embodiments of the disclosure.

FIG. 5 is a block diagram illustrating exemplary communication between a host operating system of an electronic device and a guest operating system of a simulator application operating on the electronic device according to some embodiments of the disclosure. In some embodiments, the electronic device 500 corresponds to electronic device 100 of FIG. 1, electronic device 200 of FIG. 2, electronic device 300 of FIG. 3, and/or electronic device 400 of FIG. 4. In some embodiments, the simulator application 588 corresponds to the simulator application described above with reference to FIGS. 3A-3K and/or 4A-4I. In some embodiments, host operating system 560 may operate in an information processing apparatus, such as general-purpose processors (e.g., processors 118 described with respect to FIG. 1).

As described herein, the host operating system 560 and the guest operating system 562 of the simulator application 588 may communicate to provide a testing environment for three-dimensional virtual experiences in two dimensions. Particularly, as discussed herein, the guest operating system 562 may communicate with one or more secondary applications 570 that are associated with the virtual experiences (e.g., virtual objects, agents, etc.) being evaluated using the simulator application (e.g., via the simulation user interface 312/412 discussed above). As discussed below, by interfacing the guest operating system 562 of the simulator application 588 between the host operating system 560 and the one or more secondary applications 570, physical inputs provided via one or more input devices in communication with the electronic device 500 and synthetic scene data are interpreted by the one or more secondary applications as input detected by a respective electronic device (e.g., different from the electronic device 500) and data corresponding to a (e.g., physical) environment surrounding the respective electronic device, respectively.

In some embodiments, as shown in FIG. 5, the host operating system 560 is configured to exchange data with the guest operating system 562 of the simulator application 588. Particularly, as described herein, the host operating system 560 may exchange input data and scene data with the guest operating system 562. As shown in FIG. 5 and as similarly described above, the electronic device 500 may be in communication with one or more input devices 580 (e.g., similar to touch sensitive surfaces 116 in FIG. 1 and/or keyboard 231 and mouse 232 in FIG. 2) and one or more displays 514 (e.g., corresponding to displays 114 in FIG. 1 and/or display 214 in FIG. 2). Particularly, as shown in FIG. 5, the host operating system 560 may manage an exchange of data (e.g., receive and transmit data) with the one or more input devices 580 and the one or more displays 514. In some embodiments, as shown in FIG. 5, input data service 582 of the host operating system 560 receives first input data 581 from the one or more input devices 580. Additionally, in some embodiments, scene rendering service 586 transmits display data 587 to the one or more displays 514, which will be described in more detail below.

In some embodiments, as similarly discussed above with reference to FIGS. 3A-3B, when the simulator application 588 is launched on the electronic device 500, the electronic device 500 a simulation user interface (e.g., such as simulator user interface 312/412) associated with the simulator application 588 via the one or more displays 514. In some embodiments, as discussed herein, displaying the simulation user interface includes displaying a computer-generated environment (e.g., such as computer-generated environment 350/450). In some embodiments, as shown in FIG. 5, synthetic environment provider 584 of the host operating system 560 provides scene data 589 to the scene rendering service 586 for displaying the computer-generated environment in the simulation user interface on the one or more displays 514. In some embodiments, as discussed herein, the scene data 589 corresponding to the computer-generated environment is transmitted to the scene rendering service 586 when the simulation application 588 is launched on the electronic device 500. Additionally, as described herein, the computer-generated environment is selected for display in the simulation user interface automatically (e.g., at least initially) by the synthetic environment provider 584 of the host operating system 560. In some embodiments, the synthetic environment provider 584 provides the scene data 589 in response to user input detected via the one or more input devices 580 designating a particular computer-generated environment for display in the simulation user interface, as similarly described above with reference to FIGS. 4E-4G. In some such embodiments, the input data service 582 provides scene selection data 579 to the synthetic environment provider 584 in response to receiving user input (e.g., via the first input data 581) for designating the particular computer-generated environment for display, as shown in FIG. 5.

Additionally, as shown in FIG. 5, in some embodiments, after the scene rendering service 586 of the host operating system 560 receives the scene data 589, the scene rendering service 586 transmits the display data 587 to display the simulation user interface, including the computer-generated environment, on the one or more displays 514 (e.g., as similarly shown in FIG. 3B/4A). In some embodiments, as described herein, the simulation user interface may also include one or more objects (e.g., renderings of physical objects or virtual objects/agents), such as table 336/436 or virtual agent 310/410 discussed above. In some embodiments, the one or more objects are rendered for display in the simulation user interface (e.g., within the computer-generated environment) by the scene rendering service 586 as well. In some embodiments, the scene rendering service 586 renders the one or more objects based on data received from the guest operating system 562. For example, as shown in FIG. 5, the scene rendering service 586 may receive synthetic output data 567 from the guest operating system 562 that includes information corresponding to the one or more objects, which may be included in the display data 587 transmitted to the one or more displays 514.

In some embodiments, the guest operating system 562 generates the synthetic output data 567 based on data received from the one or more secondary applications 570. As previously discussed, the simulator application 588 optionally provides a testing environment via which three-dimensional virtual experiences (e.g., appearance, responsiveness, and/or behavior of virtual objects/agents) may be evaluated in two dimensions. In some embodiments, such virtual experiences are associated with the one or more secondary applications 570 (e.g., applications launched within the simulator application 588 and/or otherwise configurable to communicate with the guest operating system 562). As shown in FIG. 5, the one or more secondary applications 570 may transmit application data 572 to the guest operating system 562. In some embodiments, the application data 572 includes information corresponding to the one or more objects discussed above, such as the virtual objects/agents. For example, the application data 572 includes information corresponding to an appearance of the virtual object, interactive features of the virtual object (e.g., whether the object can be moved, selected, etc.), positional information of the virtual object (e.g., placement of the virtual object within the computer-generated environment discussed above), etc. In some embodiments, as shown in FIG. 5, the application data 572 may be received by synthetic scene integration service 566 of the guest operating system 562. Additionally, as shown in FIG. 5, the synthetic scene integration service 566 may transmit the synthetic output data 567 discussed above to the scene rendering service 586 of the host operating system 560, wherein the synthetic output data 567 includes the information corresponding to the one or more objects discussed above.

In some embodiments, as shown in FIG. 5, the synthetic scene integration service 566 may also transmit synthetic scene data 569 to the one or more secondary applications 570. In some embodiments, the synthetic scene data 569 includes information corresponding to the computer-generated environment discussed above that is displayed in the simulation user interface via the one or more displays 514. For example, the synthetic scene data 569 includes information corresponding to one or more features of the computer-generated environment, such as an appearance of the computer-generated environment, including locations of objects within the computer-generated environment (e.g., objects that form a part of the computer-generated environment, optionally non-inclusive of virtual objects), a size of the computer-generated environment, behaviors of objects within the computer-generated environment (e.g., background objects, such as background users, pets, vehicles, etc.), etc. In some embodiments, providing the synthetic scene data 569 enables the one or more secondary applications to interpret the computer-generated environment as a "physical environment" surrounding the one or more objects (e.g., the virtual objects/agents) described above and in which the one or more objects are evaluated. For example, from the perspective of the one or more secondary applications, the computer-generated environment is a real-world environment surrounding a user of a respective electronic device (e.g., an electronic device configured to generated and present three-dimensional environments) on which the one or more secondary applications are running (when, in reality, the one or more secondary applications 570 are running within the simulator application on the electronic device 500).

In some embodiments, as similarly discussed herein, while the simulation user interface is displayed via the one or more displays 514, the electronic device 500 may receive the first input data 581 from the one or more input devices 580. As previously described herein, the first input data 581 may correspond to user input (e.g., click or press of a button or key, movement of a contact (e.g., finger or stylus) on a touch-sensitive surface, speech of a user, etc.) detected via the one or more input devices 580, such as the inputs detected on the keyboard 431/331 and/or the mouse 432/332 above. In some embodiments, as shown in FIG. 5, the input data service 582 of the host operating system 560 may receive the first input data 581 from the one or more input devices 580 and may determine to transmit the first input data 581 to the guest operating system 562 of the simulator application via second input data 583. In some embodiments, the input data service 582 generates the second input data 583 based on a context of the first input data 581 (e.g., which virtual objects/agents the user input detected via the one or more input devices 580 is directed toward). In some embodiments, as shown in FIG. 5, the second input data 583 is received from the input data service 582 by synthetic input data converter 564 of the guest operating system 562.

In some embodiments, when the synthetic input data converter 564 receives the second input data from the input data service 582 of the host operating system, the synthetic input data converter 564 generates synthetic input data 565 based on the second input data 583. As shown in FIG. 5, the synthetic input data 565 is provided as input to the one or more secondary applications 570. In some embodiments, the synthetic input data 565 includes information corresponding to an input directed toward the one or more objects (e.g., virtual objects/agents) displayed in the computer-generated environment of the simulation user interface. For example, the synthetic input data 565 includes information corresponding to input to interact with a virtual object (e.g., such as moving the application window 325 in FIG. 3C or selecting play option 327 in FIG. 3D), input for causing a virtual object to perform an operation (e.g., such as causing the virtual agent 310 to sit in the chair 337 in FIG. 3H), and/or input for moving a viewpoint of the computer-generated environment (e.g., movement of the viewpoint in FIG. 3E). In some embodiments, providing the synthetic input data 565 enables the one or more secondary applications 570 to interpret the (physical) user input provided on the one or more input devices 580 as user input directed toward the one or more objects (e.g., the virtual objects/agents) described above that are being evaluated. For example, from the perspective of the one or more secondary applications 570, the user input provided on the one or more input devices 580 is user input provided by a portion of a user (e.g., such as a hand (e.g., similar to hand 326 in FIG. 3B)) by a respective electronic device (e.g., an electronic device configured to generate and present three-dimensional environments) on which the one or more secondary applications are running (when, in reality, the one or more secondary applications are running within the simulator application 588 on the electronic device 500).

In some embodiments, in response to receiving the synthetic input data 565 from the synthetic input data converter 564 of the guest operating system 562, the one or more secondary applications 570 update the application data 572 based on the input information included in the synthetic input data 565. For example, as described herein, the one or more secondary applications 570 update the application data 572 to include updated visual information for (e.g., an appearance of) the one or more objects, updated positional information for the one or more objects, updated animation information for the one or more objects, updated orientation information for the one or more objects, etc. relative to the computer-generated environment in which the one or more objects are displayed. In some embodiments, the updated application data 572 is transmitted to the guest operating system 562 and is received by the synthetic scene integration service 566, as shown in FIG. 5.

In some embodiments, when the updated application data 572 is received from the one or more secondary applications 570, the synthetic scene integration service 566 updates and/or generates new synthetic output data 567 to be sent to the host operating system 560. For example, the synthetic output data 567 may include the updated information discussed above corresponding to the one or more objects associated with the one or more secondary applications 570. Particularly, in some embodiments, the synthetic output data

567 may include commands/instructions for updating display of the one or more objects in the computer-generated environment of the simulation user interface. As shown in FIG. 5, in some embodiments, the updated/new synthetic output data 567 may be received by the scene rendering output service 586 of the host operating system 560. In some embodiments, when the scene rendering service 586 receives the synthetic output data 567, the scene rendering service 586 updates the display data 587 based on the updated information corresponding to the one or more objects. For example, the scene rendering service 586 updates the display data 587 to include display information that causes the one or more virtual objects to visually perform one or more actions in the computer-generated environment on the one or more displays 516, such as moving within the computer-generated environment (e.g., as similarly shown in FIGS. 3D and/or 3H), initiating playback of content in the computer-generated environment (e.g., as similarly shown in FIG. 3F), and/or interacting with another object (e.g., as similarly shown in FIG. 3I). Finally, such interactions may be displayed on the one or more displays 514 when the updated display data 587 is transmitted to the one or more displays 514 in FIG. 5.

In some embodiments, as discussed herein, the one or more objects may interact with the computer-generated environment of the simulation user interface autonomously (e.g., independent of user input detected via the one or more input devices 580). In some such embodiments, as discussed herein, the host operating system 560 initiates the process for causing the one or more objects to perform one or more actions in the computer-generated environment in response to receiving data signals from the guest operating system, rather than in response to receiving input via the one or more input devices 580. For example, when the synthetic scene integration service 566 of the guest operating system 562 receives the application data 572 from the one or more secondary applications 570, the application data 572 includes information corresponding to the autonomous interactions of the one or more objects in the computer-generated environment. In some embodiments, the one or more secondary applications 570 determine the interactions of the one or more objects in the computer-generated environment based on the synthetic scene data 569. For example, with reference to FIG. 4A, the one or more secondary applications 570 determine the path of motion of the virtual agent 410 to the doorway 438 based on positions of the chair 437 and the table 436 within the computer-generated environment 450. In some embodiments, as similarly described above, the synthetic scene integration service 566 may transmit the information corresponding to the interactions of the one or more objects via the synthetic output data 567 to the host operating system 560. As shown in FIG. 5, the scene rendering service 586 of the host operating system 560 may receive the synthetic output data 567 and may transmit the display data 587 to the one or more displays 514 to cause the one or more objects to perform the one or more actions within the computer-generated environment in accordance with the synthetic output data 567 (e.g., such as the movement of the virtual agent 410 to the doorway 438 as shown in FIGS. 4B-4D).

Electronic device 500 is not limited to the components and configuration of FIG. 5, but can include fewer, other, or additional components in multiple configurations. In some examples, electronic device 500 can be implemented between two electronic devices (e.g., as a system). Additionally, the processes described above are exemplary and it should therefore be understood that more, fewer, or different operations can be performed using the above components and/or using fewer, other, or additional components in multiple configurations.

Figure 6:
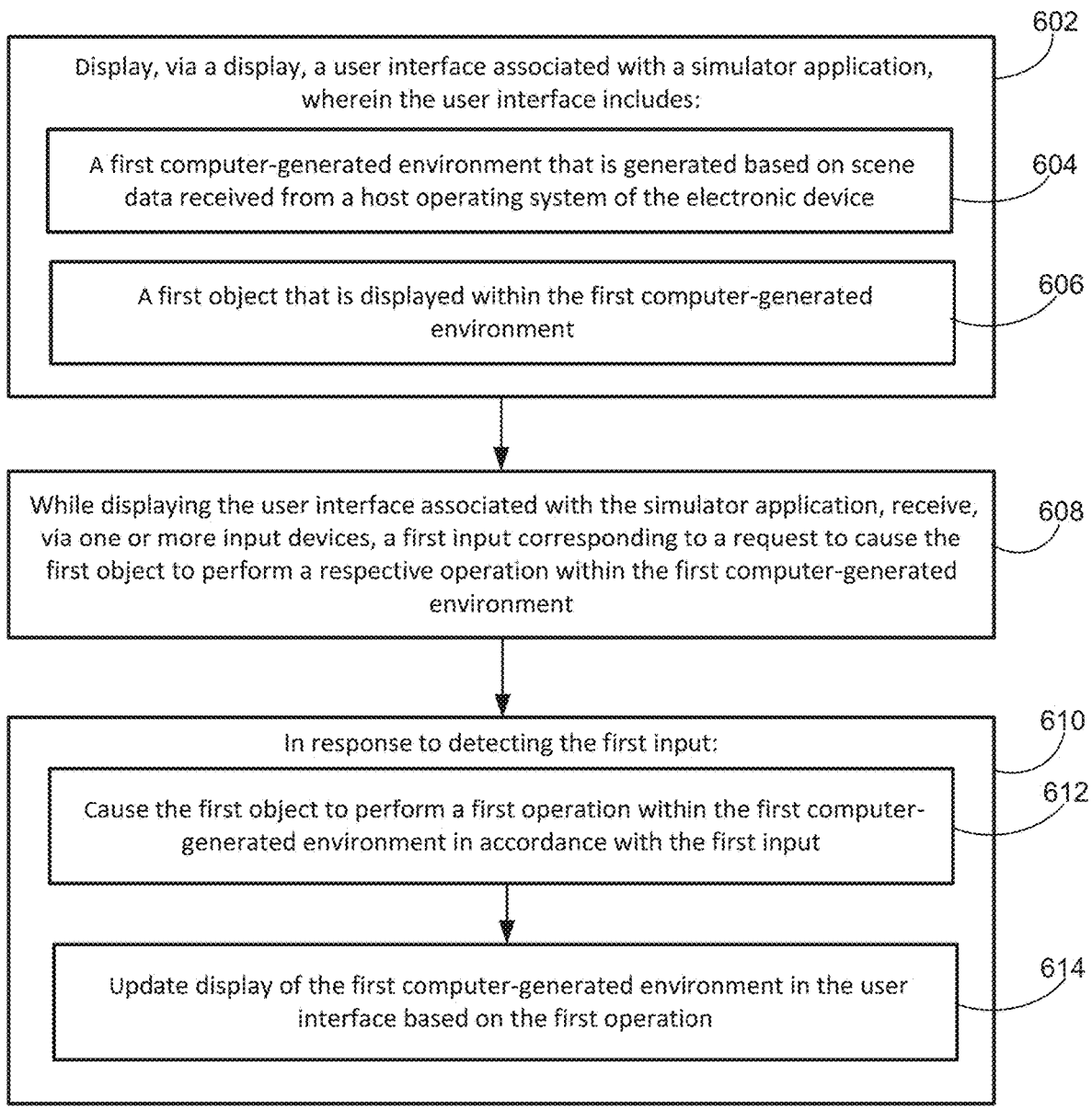
FIG. 6 is a flow diagram illustrating an example process for interacting with an object within a simulator application operating on an electronic device according to some embodiments of the disclosure.

FIG. 6 is a flow diagram illustrating an example process for interacting with an object within a simulator application operating on an electronic device according to some embodiments of the disclosure. In some embodiments, process 600 begins at an electronic device in communication with a display and one or more input devices. In some embodiments, the electronic device is optionally a desktop computer or mobile device similar or corresponding to device 100 of FIG. 1. As shown in FIG. 6, in some embodiments, at 602, the electronic device displays, via the display, a user interface associated with a simulator application. In some embodiments, at 604, the user interface includes a first computer-generated environment that is generated based on scene data received from a host operating system of the electronic device, and, at 606, a first object that is displayed within the first computer-generated environment. For example, referring to FIG. 3B, electronic device 300 displays, on display 314, simulation user interface 312 that includes computer-generated environment 350 and a representation of a respective user (e.g., hand 326) and application window 325 that are displayed within the computer-generated environment 350.

In some embodiments, at 608, while displaying the user interface associated with the simulator application, the electronic device receives, via the one or more input devices, a first input corresponding to a request to cause the first object to perform a respective operation within the first computer-generated environment. For example, as described previously with reference to FIG. 3C, the electronic device 300 detects input via the one or more input devices, such as the mouse 332, corresponding to a request to cause the hand 326 of the respective user to provide input for moving the application window 325 in the computer-generated environment 350. In some embodiments, at 610, in response to detecting the first input, at 612, the electronic device causes the first object to perform a first operation within the first computer-generated environment in accordance with the first input. For example, as described with reference to FIG. 3D, the electronic device 300 causes the hand 326 to provide input (e.g., via controller 322) for moving the application window 325 (e.g., rightward) in the computer-generated environment 350. Additionally, in some embodiments, at 614, the electronic device updates display of the first computer-generated environment in the user interface based on the first operation. For example, as shown in FIG. 3D, the electronic device 300 moves the application window 325 rightward in the computer-generated environment 350 based on the input provided by the hand 326.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 1) or application specific chips, and/or by other components of FIG. 1.

Figure 7:
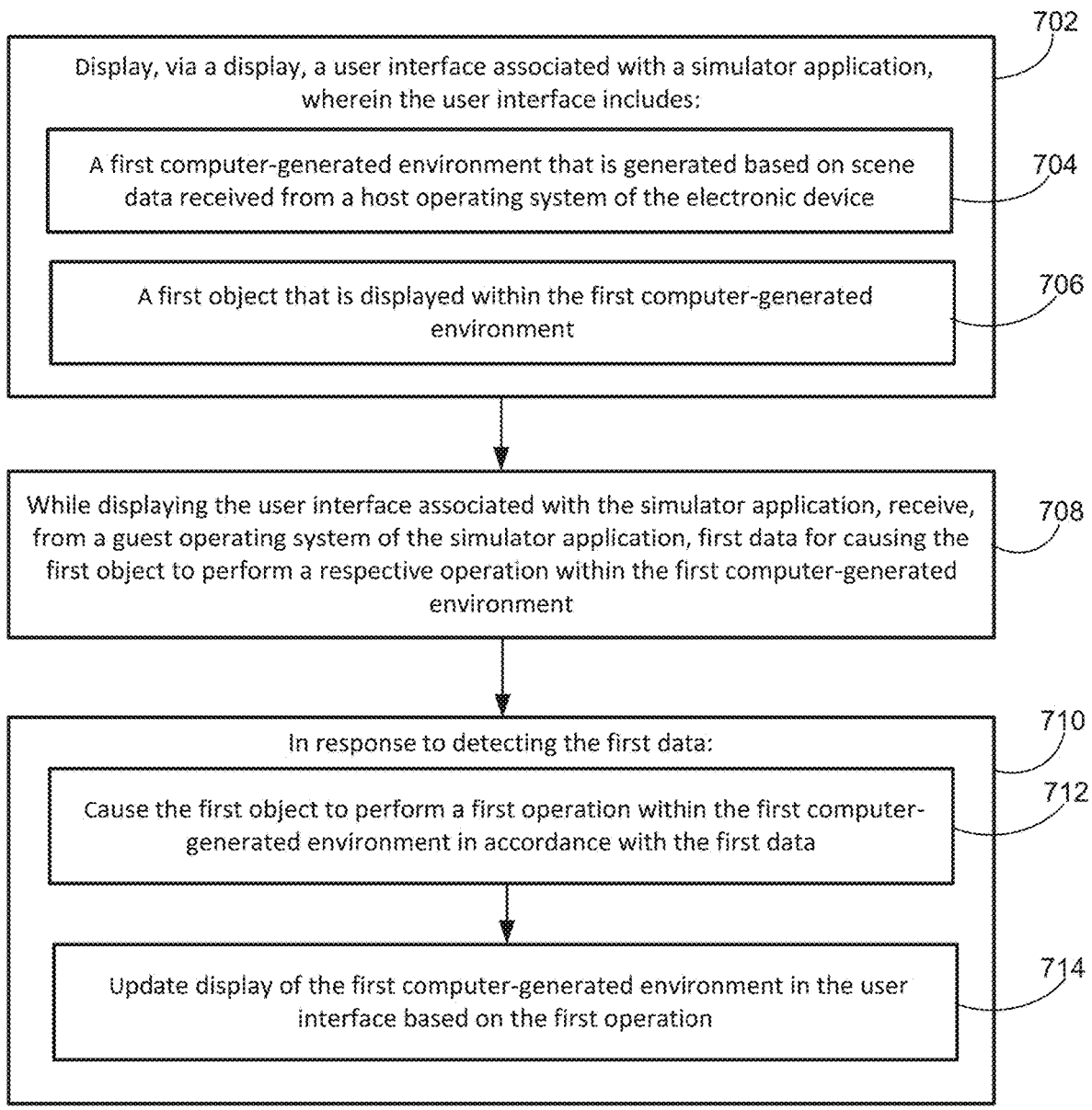
FIG. 7 is a flow diagram illustrating an example process for autonomous interactions of an object within a simulator application operating on an electronic device according to some embodiments of the disclosure.

FIG. 7 is a flow diagram illustrating an example process for autonomous interactions of an object within a simulator application operating on an electronic device according to some embodiments of the disclosure. In some embodiments, process 700 begins at an electronic device in communication with a display and one or more input devices. In some embodiments, the electronic device is optionally a desktop computer or mobile device similar or corresponding to device 100 of FIG. 1. As shown in FIG. 7, in some embodiments, at 702, the electronic device displays, via the display, a user interface associated with a simulator application. In some embodiments, at 704, the user interface includes a first computer-generated environment that is generated based on scene data received from a host operating system of the electronic device, and, at 706, a first object that is displayed within the first computer-generated environment. For example, referring to FIG. 4A, electronic device 400 displays, on display 414, simulation user interface 412 that includes computer-generated environment 450 and virtual agent 410 that is displayed within the computer-generated environment 450.

In some embodiments, at 708, while displaying the user interface associated with the simulator application, the electronic device receives, from a guest operating system of the simulator application, first data for causing the first object to perform a respective operation within the first computer-generated environment. For example, as described previously with reference to FIG. 4A, the electronic device 400 receives first data from guest operating system of the simulator application for causing the virtual agent 410 to autonomously travel toward doorway 438 in the computer-generated environment 450 (e.g., and without detecting input via the one or more input devices, such as the mouse 432). In some embodiments, at 710, in response to detecting the first data, at 712, the electronic device causes the first object to perform a first operation within the first computer-generated environment in accordance with the first data. For example, as shown in FIGS. 4B-4D, the electronic device 400 causes the virtual agent 410 to autonomously move toward the doorway 438 (including avoiding contact with other objects, such as the table 436 and the chair 437) in the computer-generated environment 450. Additionally, in some embodiments, at 714, the electronic device updates display of the first computer-generated environment in the user interface based on the first operation. For example, as shown in FIG. 4H, the electronic device 400 displays additional portions of computer-generated environment 452 based on the movement of the virtual agent 410.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 1) or application specific chips, and/or by other components of FIG. 1.

Therefore, according to the above, some examples of the disclosure are directed to a method, comprising, at an electronic device in communication with a display and one or more input devices: displaying, via the display, a user interface associated with a simulator application, wherein the user interface includes a first computer-generated environment that is generated based on scene data received from a host operating system of the electronic device, and a first object that is displayed within the first computer-generated environment; while displaying the user interface associated with the simulator application, receiving, via the one or more input devices, a first input corresponding to a request to cause the first object to perform a respective operation within the first computer-generated environment; and in response to receiving the first input, causing the first object to perform a first operation within the first computer-generated environment in accordance with the first input, and updating display of the first computer-generated environment in the user interface based on the first operation.

Additionally or alternatively, in some embodiments, the electronic device is a desktop or laptop computer. Additionally or alternatively, in some embodiments, the simulator application includes a guest operating system. Additionally or alternatively, in some embodiments, updating the display of the first computer-generated environment in the user interface based on the first operation is in accordance with data received from the guest operating system of the simulator application. Additionally or alternatively, in some embodiments, the first object includes a virtual agent. Additionally or alternatively, in some embodiments, the first object includes a virtual representation of a first user, different from a user of the electronic device. Additionally or alternatively, in some embodiments, the first computer-generated environment corresponds to a virtual physical environment surrounding the first user. Additionally or alternatively, in some embodiments, receiving the first input corresponding to the request to cause the first object to perform the respective operation within the first computer-generated environment includes detecting movement of a contact on a touch-sensitive surface of an input device in communication with the electronic device. Additionally or alternatively, in some embodiments, receiving the first input corresponding to the request to cause the first object to perform the respective operation within the first computer-generated environment includes detecting selection of one or more keys of a keyboard in communication with the electronic device.

Additionally or alternatively, in some embodiments, causing the first object to perform the first operation within the first computer-generated environment in accordance with the first input includes causing the first object to move within the first computer-generated environment. Additionally or alternatively, in some embodiments, causing the first object to perform the first operation within the first computer-generated environment in accordance with the first input includes causing the first object to interact with a second object included in the first computer-generated environment. Additionally or alternatively, in some embodiments, before receiving the first input, displaying the first computer-generated environment in the user interface includes displaying first portions of the first computer-generated environment, without displaying second portions, different from the first portions, of the first computer-generated environment, and in response to receiving the first input, updating the display of the first computer-generated environment in the user interface based on the first operation includes displaying, via the display, the second portions of the first computer-generated environment in the user interface. Additionally or alternatively, in some embodiments, before receiving the first input, the first computer-generated environment includes a second object, and in response to receiving the first input, updating the display of the first computer-generated environment in the user interface based on the first operation includes causing the second object to perform a second operation in the first computer-generated environment. Additionally or alternatively, in some embodiments, the scene data received from the host operating system of the electronic device corresponds to previously authored data saved in memory of the electronic device for rendering the first computer-generated environment.

Additionally or alternatively, in some embodiments, the first computer-generated environment is selected for display in the user interface from a library of computer-generated environments in the simulator application, the library of computer-generated environments including a second computer-generated environment that is configurable to be displayed in the user interface using second scene data saved in the memory of the electronic device. Additionally or alternatively, in some embodiments, the first computer-generated environment does not include captured portions of a physical environment surrounding the electronic device. Additionally or alternatively, in some embodiments, the first object is associated with a secondary application that is in communication with a guest operating system of the simulator application, and in response to receiving the first input: the host operating system transmits, to the guest operating system, input data corresponding to the first input; the guest operating system generates synthetic input data based on the input data; and the guest operating system transmits, to the secondary application, the synthetic input data. Additionally or alternatively, in some embodiments, causing the first object to perform the first operation within the first computer-generated environment in accordance with the first input is in accordance with synthetic output data received from the guest operating system. In some embodiments, the synthetic output data is generated by using the guest operating system based on application data received from the secondary application, and the application data is generated by using the secondary application based on the synthetic input data.

Some embodiments of the disclosure are directed to an electronic device, comprising: one or more processors; memory; and one or more programs, wherein the one or more programs are stored in the memory and configured to be executed by the one or more processors, the one or more programs including instructions for performing any one of the above methods.

Some embodiments of the disclosure are directed to a non-transitory computer readable storage medium storing one or more programs, the one or more programs comprising instructions, which when executed by one or more processors of an electronic device, cause the electronic device to perform any one of the above methods.

Some embodiments of the disclosure are directed to a method, comprising at an electronic device in communication with a display and one or more input devices: displaying, via the display, a user interface associated with a simulator application, wherein the user interface includes a first computer-generated environment that is generated based on scene data received from a host operating system of the electronic device, and a first object that is displayed within the first computer-generated environment; while displaying the user interface associated with the simulator application, receiving, from a guest operating system of the simulator application, first data for causing the first object to perform a respective operation within the first computer-generated environment; and in response to receiving the first data, causing the first object to perform a first operation within the first computer-generated environment in accordance with the first data, and updating display of the first computer-generated environment in the user interface based on the first operation.

Additionally or alternatively, in some embodiments, the electronic device is a desktop or laptop computer. Additionally or alternatively, in some embodiments, the first object includes a virtual agent. Additionally or alternatively, in some embodiments, the first object includes a virtual representation of a first user, different from a user of the electronic device. Additionally or alternatively, in some embodiments, the first computer-generated environment corresponds to a virtual physical environment surrounding the first user. Additionally or alternatively, in some embodiments, causing the first object to perform the first operation within the first computer-generated environment in accordance with the first data includes causing the first object to move within the first computer-generated environment. Additionally or alternatively, in some embodiments, causing the first object to perform the first operation within the first computer-generated environment in accordance with the first data includes causing the first object to interact with a second object included in the first computer-generated environment. Additionally or alternatively, in some embodiments, before receiving the first data, displaying the first computer-generated environment in the user interface includes displaying first portions of the first computer-generated environment, without displaying second portions, different from the first portions, of the first computer-generated environment, and in response to receiving the first data, updating the display of the first computer-generated environment in the user interface based on the first operation includes displaying, via the display, the second portions of the first computer-generated environment in the user interface. Additionally or alternatively, in some embodiments, before receiving the first data, the first computer-generated environment includes a second object, and in response to receiving the first data, updating the display of the first computer-generated environment in the user interface based on the first operation includes causing the second object to perform a second operation in the first computer-generated environment.

Additionally or alternatively, in some embodiments, the scene data received from the host operating system of the electronic device corresponds to previously authored data saved in memory of the electronic device for rendering the first computer-generated environment. Additionally or alternatively, in some embodiments, the first computer-generated environment is selected for display in the user interface from a library of computer-generated environments in the simulator application, the library of computer-generated environments including a second computer-generated environment that is configurable to be displayed in the user interface using second scene data saved in the memory of the electronic device. Additionally or alternatively, in some embodiments, the first computer-generated environment does not include captured portions of a physical environment surrounding the electronic device. Additionally or alternatively, in some embodiments, the first data includes program instructions for animating the first operation of the first object in the first computer-generated environment. Additionally or alternatively, in some embodiments, the first data is received from the guest operating system independent of input received via the one or more input devices. Additionally or alternatively, in some embodiments, the first object is associated with a secondary application that is in communication with the guest operating system, and the first data is generated by using the guest operating system based on application data received from the secondary application. Additionally or alternatively, in some embodiments, the secondary application generates the application data based using on synthetic scene data received from the guest operating system, and the synthetic scene data is generated by using the guest operating system based on the scene data that is received from the host operating system.

Some embodiments of the disclosure are directed to an electronic device, comprising: one or more processors; memory; and one or more programs, wherein the one or more programs are stored in the memory and configured to be executed by the one or more processors, the one or more programs including instructions for performing any one of the above methods.

Some embodiments of the disclosure are directed to a non-transitory computer readable storage medium storing one or more programs, the one or more programs comprising instructions, which when executed by one or more processors of an electronic device, cause the electronic device to perform any one of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method, comprising:
    at an electronic device including a display and in communication with one or more input devices:
        displaying, via the display, a user interface associated with a simulator application, wherein the user interface includes:
            a first computer-generated environment that is generated based on scene data received from a host operating system of the electronic device; and
            a first object that is displayed within the first computer-generated environment;
        while displaying the user interface associated with the simulator application, receiving, via the one or more input devices, a first input to the electronic device corresponding to a request to cause the first object to perform a respective operation within the first computer-generated environment; and
        in response to receiving the first input:
            causing the first object to perform a first operation within the first computer-generated environment in accordance with the first input; and
            updating display of the first computer-generated environment in the user interface based on the first operation.

2. The method of claim 1, wherein the electronic device is a desktop or laptop computer.

3. The method of claim 1, wherein the simulator application includes a guest operating system.

4. The method of claim 3, wherein updating the display of the first computer-generated environment in the user interface based on the first operation is in accordance with data received from the guest operating system of the simulator application.

5. The method of claim 1, wherein the first object includes a virtual agent.

6. The method of claim 1, wherein the first object includes a virtual representation of a first user, different from a user of the electronic device.

7. The method of claim 6, wherein the first computer-generated environment corresponds to a virtual physical environment surrounding the first user.

8. The method of claim 1, wherein receiving the first input corresponding to the request to cause the first object to perform the respective operation within the first computer-generated environment includes detecting movement of a contact on a touch-sensitive surface of an input device in communication with the electronic device.

9. The method of claim 1, wherein receiving the first input corresponding to the request to cause the first object to perform the respective operation within the first computer-generated environment includes detecting selection of one or more keys of a keyboard in communication with the electronic device.

10. The method of claim 1, wherein causing the first object to perform the first operation within the first computer-generated environment in accordance with the first input includes causing the first object to move within the first computer-generated environment.

11. The method of claim 1, wherein causing the first object to perform the first operation within the first computer-generated environment in accordance with the first input includes causing the first object to interact with a second object included in the first computer-generated environment.

12. The method of claim 1, wherein:
    before receiving the first input, displaying the first computer-generated environment in the user interface includes displaying first portions of the first computer-generated environment, without displaying second portions, different from the first portions, of the first computer-generated environment; and
    in response to receiving the first input, updating the display of the first computer-generated environment in the user interface based on the first operation includes displaying, via the display, the second portions of the first computer-generated environment in the user interface.

13. The method of claim 1, wherein:
    before receiving the first input, the first computer-generated environment includes a second object; and
    in response to receiving the first input, updating the display of the first computer-generated environment in the user interface based on the first operation includes causing the second object to perform a second operation in the first computer-generated environment.

14. The method of claim 1, wherein the scene data received from the host operating system of the electronic device corresponds to previously authored data saved in memory of the electronic device for rendering the first computer-generated environment.

15. The method of claim 14, wherein the first computer-generated environment is selected for display in the user interface from a library of computer-generated environments in the simulator application, the library of computer-generated environments including a second computer-generated environment that is configurable to be displayed in the user interface using second scene data saved in the memory of the electronic device.

16. The method of claim 1, wherein the first computer-generated environment does not include captured portions of a physical environment surrounding the electronic device.

17. The method of claim 1, wherein:
    the first object is associated with a secondary application that is in communication with a guest operating system of the simulator application; and
    in response to receiving the first input:
        the host operating system transmits, to the guest operating system, input data corresponding to the first input;
        the guest operating system generates synthetic input data based on the input data; and
        the guest operating system transmits, to the secondary application, the synthetic input data.

18. The method of claim 17, wherein:
    causing the first object to perform the first operation within the first computer-generated environment in accordance with the first input is in accordance with synthetic output data received from the guest operating system;

the synthetic output data is generated using the guest operating system based on application data received from the secondary application; and the application data is generated using the secondary application based on the synthetic input data.

19. An electronic device, comprising:

a display;

one or more processors;

memory; and one or more programs, wherein the one or more programs are stored in the memory and configured to be executed by the one or more processors, the one or more programs including instructions for:

displaying, via the display, a user interface associated with a simulator application, wherein the user interface includes:

a first computer-generated environment that is generated based on scene data received from a host operating system of the electronic device; and a first object that is displayed within the first computer-generated environment;

while displaying the user interface associated with the simulator application, receiving, via one or more input devices, a first input to the electronic device corresponding to a request to cause the first object to perform a respective operation within the first computer-generated environment; and in response to receiving the first input:

causing the first object to perform a first operation within the first computer-generated environment in accordance with the first input; and updating display of the first computer-generated environment in the user interface based on the first operation.

20. A non-transitory computer readable storage medium storing one or more programs, the one or more programs comprising instructions, which when executed by one or more processors of an electronic device including a display, cause the electronic device to perform a method comprising:

displaying, via the display, a user interface associated with a simulator application, wherein the user interface includes:

a first computer-generated environment that is generated based on scene data received from a host operating system of the electronic device; and a first object that is displayed within the first computer-generated environment;

while displaying the user interface associated with the simulator application, receiving, via one or more input devices, a first input to the electronic device corresponding to a request to cause the first object to perform a respective operation within the first computer-generated environment; and in response to receiving the first input:

causing the first object to perform a first operation within the first computer-generated environment in accordance with the first input; and updating display of the first computer-generated environment in the user interface based on the first operation.

\* \* \* \* \*